US011573961B2

(12) United States Patent
Chandramouli et al.

(10) Patent No.: US 11,573,961 B2
(45) Date of Patent: Feb. 7, 2023

(54) DELTA GRAPH TRAVERSING SYSTEM

(71) Applicant: Microsoft Technology Licensing, LLC, Redmond, WA (US)

(72) Inventors: Bharat Chandramouli, Bellevue, WA (US); Yuqing Gao, Bellevue, WA (US); Derek Baron, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 16/508,085

(22) Filed: Jul. 10, 2019

(65) Prior Publication Data
US 2021/0011913 A1    Jan. 14, 2021

(51) Int. Cl.
G06F 16/2453    (2019.01)
G06F 16/23      (2019.01)
G06F 16/901     (2019.01)

(52) U.S. Cl.
CPC .... *G06F 16/24542* (2019.01); *G06F 16/2379* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 9,244,899 B1 * | 1/2016 | Greenbaum | ........... | G06F 40/177 |
| 9,378,241 B1 * | 6/2016 | Shankar | ............... | G06F 16/2425 |
| 9,424,333 B1 * | 8/2016 | Bisignani | ............... | G06F 16/248 |
| 10,824,420 B2 * | 11/2020 | Collins | ..................... | G06F 8/10 |
| 2015/0269280 A1 | 9/2015 | Astier | | |
| 2015/0350324 A1 * | 12/2015 | Hu | ....................... | H04L 67/1031 709/219 |
| 2016/0179789 A1 * | 6/2016 | Chen | ....................... | G06F 40/58 704/3 |
| 2016/0330180 A1 * | 11/2016 | Egorov | .................... | G06F 21/14 |
| 2018/0329958 A1 | 11/2018 | Choudhury et al. | | |
| 2018/0349368 A1 * | 12/2018 | Bellingham | ........ | H04N 21/4722 |
| 2019/0005163 A1 * | 1/2019 | Farrell | ....................... | G06F 8/36 |

(Continued)

FOREIGN PATENT DOCUMENTS

EP    2731022 A1    5/2014

OTHER PUBLICATIONS

"International Search Report and Written Opinion Issued in PCT Application No. PCT/US20/036715", dated Sep. 1, 2020, 11 Pages.

*Primary Examiner* — Richard L Bowen

(57) ABSTRACT

Methods and systems are disclosed for traversing a graph database. The graph database may be used for search for information for a variety of applications, a web search and dictionary look-ups for voice recognitions for examples. Issues on quickly traversing a graph in the graph database with highly connected entities (nodes) may be addressed by generating a subgraph upon a graph traversal for an entity and traversing the subgraph in subsequent occurrences of looking up the entity. The methods and systems are disclosed for updating the entity of the subgraph with a newer version of data of the corresponding entity of the graph when the data in the entity of the subgraph and the data in the graph are distinct. The differences of versions of data may be identified based on an availability status of data for versions of data and timestamps of last updates to data in the entity of the graph.

19 Claims, 14 Drawing Sheets

(56) References Cited

U.S. PATENT DOCUMENTS

2020/0057946 A1\* 2/2020 Singaraju ............... G06N 5/022
2020/0082026 A1\* 3/2020 Tian .................... G06F 16/9024
2020/0313957 A1\* 10/2020 A .......................... H04L 41/082

\* cited by examiner

500A

Freshness Table: Last Update: 2019/05/17 at 0500UTC

| Identifier 504 | Predicate 506 | Source 508 | Versions/Deleted Flags 510 |
|---|---|---|---|
| 00000100 | works as | source001 | 1/True, 2/True, 3/False |
| 00000200 | in next sequel | source002 | 1/True, 2/True, 3/True, 4/False |

520 — Source Configuration
Last Update: 2019/05/17 at 0500UTC

| Source 522 | Version to Use 524 |
|---|---|
| source001 | 3 |
| source002 | 4 |

540 — Query Configuration: Last Update: 2019/05/17 at 0500UTC

| Type of Entity 542 | Level of the Graph 544 | Structure to Follow 546 |
|---|---|---|

FIG. 5C

DELTA GRAPH TRAVERSING SYSTEM

BACKGROUND

The demand for a higher performance in searching for information has become significant as more people search for and retrieve information from web search services that return search results based on a vast amount information over the Internet and other networks. There have been drastic increases in both a number of users of such services and in an amount information to be searched in response to queries. In a case of news aggregation services, for example, new information about facts and analyses may become available at any moment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by improving an efficiency of searching for entities of a database including traversing a graph for example. The issues on quickly traversing a graph in the graph database may be addressed by generating a subgraph upon a graph traversal for an entity and traverse the subgraph in subsequent occurrences of looking up the entity when the subgraph and the graph are consistent. The present disclosure for example provides methods and systems retrieving a subgraph is retrieved based on a previous traversal to search for an entity, determining a traversal path, traversing the subgraph, identifying new version of the entities in the graph, and updating the subgraph based on the entities in the graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 5A-5C illustrate data structures with which the disclosure may be practiced in accordance with aspects of the present disclosure.

DETAILED DESCRIPTION

Figure 1:
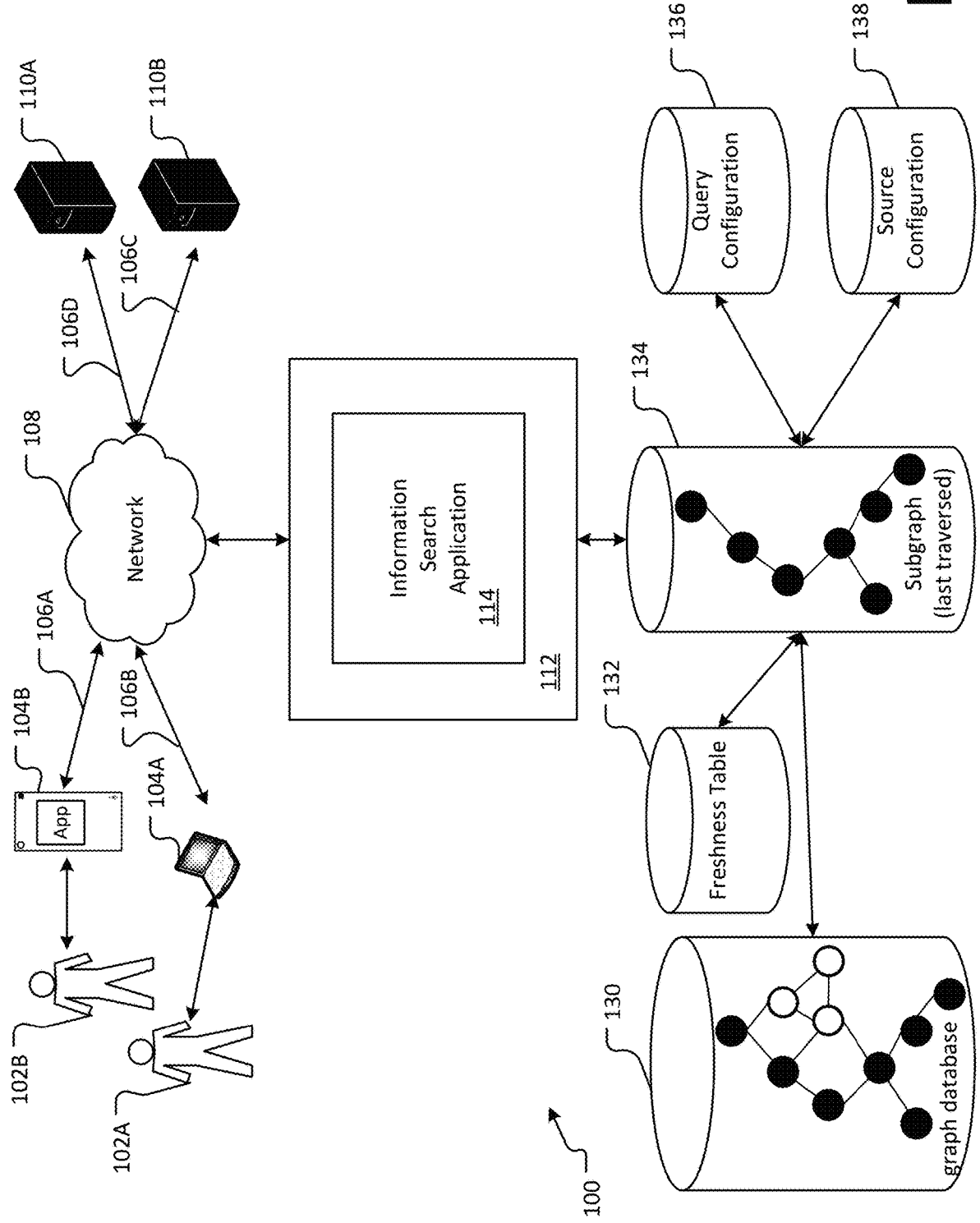
FIG. 1 illustrates an overview of an example system for a graph traversing system in accordance with aspects of the present disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for traversing a graph database. The graph database may be used to search for information which results are used by various applications. For example, web search services may use the graph database to store a vast amount of facts that consist of subjects, objects, and relationship among the subjects and the objects. News feed services may use the graph database to store the facts and relationships among the facts as new facts may be ingested in the graph database as new events occur.

Voice recognition systems and text recognition systems may use the graph database as a knowledge base to classify voice and text segments that the systems extract from voice and text input data respectively. The services and applications depend on a quick speed and accuracy of retrieving information by traversing the graph. The entities have attributes and are connected to each other via relationships. The attributes and relationships are stored as facts modeled as sets of subject-predicate-object. In at least some aspects, nodes in the graph may be highly connected when a number of facts stored in the graph becomes large. In some graphs, there may be several hundreds of thousands of facts stored in the graph. A node may be connected from millions of nodes, for example. The node may connect to millions of other nodes, as another example. Subjects that are well-known, such as a name of a popular musician with many relevant facts, may be highly connected from and to other subjects and objects.

Different types of information may have different levels of time requirements to be ingested in the graph database. For example, there may be news information that may require frequent and time-sensitive ingestion or registration to the graph. On the other hand, there may be information that are not as time-critical as the above.

In at least some aspects, an entity may be described as a part of a series of facts. Each fact is represented as a semantic triple based on the Resource Description Framework (RDF). A fact may include a subject, a predicate, an object, contexts, a update/deletion timestamp and other metadata. The metadata may include but not limited to market, confidence levels of facts, and rank. A subject may identify an entity/node in the graph. In at least some aspects, the graph may be generated after conflation of subjects from various sources with identifiers that identify respective nodes. A predicate may describe an attribute of the subject. For example, a predicate may be an age when the subject represents a person. The predicate links the subject to the object which contains the actual value. The object is an actual value for the property as defined by the predicate for a given subject that the predicate connects. For example, the object may be 25 years old when the subject represents a person and the predicate of the age links the subject and the object. When the object represents a literal value, the object describes a property of the entity. On the other hand, when the object is another subject, it describes a relationship to another entity. There may be two or more levels of linked nodes by linking three or more nodes with predicates. The graph may impose a maximum number of levels to maintain processing required within a predefined maximum steps during graph traversals.

Contexts identify source information as a fact in the graph comes in from several sources. The contexts may be divided into two types: a platform context and a knowledge context. The platform context identifies a source. The knowledge context may be used as data to tag nodes. The tagged knowledge contexts of nodes may be used to calculate confidence scores of semantic relations among facts and selectively process source specific rules. Confidence levels and ranks are used to determine the importance of a given fact. Confidence levels may be determined is predictable and calculated at the level of the fact before graph traversals. Generating ranks may be determined as a result of traversing the graph.

The graph may be stored in a key-value pair. The key may be represented by a graph node identifier and a predicate. The value may include values and metadata associated with the values. In at least some aspects, an ingestion of a complete fact may require at least several sources that provide entities to be inserted or updated in the graph; some other facts may require only a few sources that provide entities. In at least some aspects, there may be more than one version of values in the key-value pair indexed by version numbers. In some other aspect, each version may have a unique key based on a unique entity identifier.

An event processing system may process a graph traversal for each entity of a query input. The graph traversal may occur at least in the following three aspects. First is the traversal of data in the graph for retrieval of facts. The graph traversal may convert data from the graph into facts based on the entities or nodes as being traversed. Second is a query configuration. The query configuration may be an XML (Extensible Mark-up Language) that defines a structure of a path to follow at each level of the graph traversal for a give type of entity. The query configuration may limit the number of connections of a graph traversal. Third, a source configuration may identify versions of data for use with each source at the time of a graph traversal. When a new version of data is ingested in the graph, use of the source configuration enables a roll-forward and roll-back of versions of data. For example, the roll-forward of a version of data may be used to retrieve the latest version of data from the graph. On the other hand, the roll-back may be used to retrieve a previous version of data from the graph when the current version of data is determined to be unusable or unavailable.

In at least some aspects, the entities at the information store may fall into several tiers with different requirements. The several tiers may include a top tier, a big tier, an hourly fresh, and a super fresh. Entities in the top tier may require updates to be pushed within a period, one day period, for example. For example, there may be about 25 to 30 million entities that account for more than 95% of the impressions. The periodic data ingestion into the graph may have gating after a graph traversal to maintain integrity of overall data since several sources may provide data changes to the entities in the top tier data.

Data in the big tier may include entities that are a part that is other than the top tier data of search results in information search system. The big tier data may be more tolerant to delays. For example, the big tier data may include about 300 million entities, which is much larger than the top tier data. The big tier data may require the updates to be pushed within a day while the big tier data may have gating after the day as several source may provide data changes to the entities in the big tier data.

Data in the hourly fresh tier may include entities that need to be updated within an hour. These data are typically entities controlled by few sources that don't need gating after traversal is complete. Examples of the hourly refresh may include product information and music entities where the changes come from a single source. Data in the super fresh tier may include updates that need to be pushed to the graph immediately. The data in the super fresh tier may include editorial updates, real-estate price changes, and changes of critical attributes from information dictionary services on the web.

In at least some aspects, a new version of data may become available for each node as the data is ingested into the graph. Ingestion of data in the top tier and the big tier, however, may require to wait for all the associated data to be ingested in to the graph from two or more sources for a given new version to prevent use of partially ingested versions.

In at least some aspects, all required data may be retrieved each time the entity was traversed irrespective of whether the data has changed or not when a number of entities is limited. There may be several different approaches to traverse the graph and generate entities. For example, join operations may be performed by scanning the all the nodes. The join approach may perform a bottom-up traversal of the graph by repeatedly joining the entities to discover connections between them. The join approach may require generating all primary entities (about two billion entities, for example) while only a small number (330 million entities, for example) are visible to end-user who retrieve search results of a query input. For example, a relatively small portion of the entities (about 30 million, for example) may account for 95% of the impressions (views) on an exemplar website. The process intensive nature of the join approach may require a parallel pipeline processing that includes performing the fresh tier data updates with top-down traversals of the graph while another pipeline performing either a pipeline with some fresh updates from select sources without satisfying the gating requirements among data tiers or while preventing updates of data from other sources. The join approach may require regenerating all the entities (two billion entities, for example) when the latest version of data from select sources need to be blocked and thus the data associated with the latest version in the graph need to be rolled back. The join approach may limit the number of levels for traversal within a given resource requirement since each level has to be implemented as a join operation.

Additionally or alternatively, the graph may be traversed based on message passing. A reverse index may be used to look up entities connected with an entity that contains an update. Use of the reverse index can reduce the amount of data retrieved along the paths that have changes. The messaging passing may update entities based on proximity to the updated entity in the graph and not based on importance of respective entities. Moreover, the message passing based on the reverse index may raise consistency issues among the entities as the reverse index does not indicate whether specific entities are to be published. The reverse look up may require additional resources to perform maintenance and update of the graph for reverse indexing. A significantly large amount of message passing may occur among entities when entities are highly connected in the graph. For example, updating a word "USA" may result in updating several hundred million entries. In another example, some entities such as a popular last name of a person may be connected to over several thousand entities, and the entities with a large number of links may result in receiving messages from many entities. The message passing approach may require a large amount of computing resources as a number of messages increases based on how entities are linked in the graph. Moreover, processing may become intensive upon selecting all permutations for a large amount of sources (over 300 sources, for example) and version of at least five for each fact, for example.

In some other aspect, a full top-down graph traversal approach may involve traversing entities based on a breadth-first search (BFS) in a top-down manner from the top entity in the graph. For a graph traversal, the system may first look up the query configuration. Based on the query configuration that provides which links in traversing the graph, the root entity may be accessed as a starting point and follow the links based on BFS. For each entity reached during the traversal of the graph, the source configuration may be used to identify which version of the facts should be used for each retrieved subject-predicate data and process the data. The full top-down graph traversal approach may be suitable for tiers of data that require frequent updates with gating, while scaling of the graph may result in this approach process-intensive.

It is with respect to these and other general considerations that embodiments have been made. To address issues that relate to efficiently traversing a graph, the systems and methods for traversing a graph database provides high-performance graph traversals to search entities and information by performing a top-down graph traversal while only retrieving data that has changes made since the last time when the graph traversal was performed.

In at least some aspects, the high-performance graph traversal may include steps that uses both data versions and timestamps to determine what data/configuration has changed since the last time graph traversal was performed on the entity. Additionally or alternatively, the high-performance graph traversal may include a freshness table that indicates which entities (nodes in the graph) contain updates during traversal while maintaining a very small footprint for processing. For example, a freshness table may have a size of 77 KBytes to store all version history for 35 MBytes of data. Having a small size for the freshness table may greatly reduce input/output requirements when data does not change. In yet some other aspects, the high-performance graph traversal may be based on the top-down approach by traversing a subgraph, which is generated during the last entity search, to check if all entities having data updates before fetching data from the graph during the traversal of the graph. In at least some aspects, the subgraph may be a subset of the graph. The subgraph may be generated by copying a portion of the graph, which may include a set of subjects, predicates, and objects traversed in the graph while looking up an entity. Alternatively or additionally, the subgraph may include metadata, one or more indexes for searching the subgraph for example, in addition to the set of nodes and links copied from the graph.

In at least some aspects, the high-performance graph traversal may include steps of retrieving a last generated subgraph based on a graph traversal for the single entity being looked up, looking up a query configuration to identify a path for the graph traversal, traversing the subgraph from the top/root entity according to BFS, looking up a freshness table by using the entity identifier as a key to retrieve available versions of data for each node, looking up a source configuration to determine which version of data to use for each retrieved subject-predicate-data, and adding the data to the subgraph. The approach may further include steps of checking for changes in the graph data based on available versions data. Additionally or alternatively, the steps of checking for changes in the graph data may include steps of checking what versions are available in the last search subgraph, checking which versions are available in the freshness table for a given entity identifier and a predicate, checking the source configuration to identify which versions need to be published and picking the version from the freshness table that identifies the latest version for publishing. In at least some aspects, the graph may be queried when the latest version is not published during the last graph traversal but no query to the graph is needed if there is no update in the entity since the last traversal. Furthermore, the steps may include checking last-modified timestamps of the graph, the subgraph, the source configuration, and the query configuration, and fetch data from the graph when the nodes in the graph contains the data with a version that is more recent than the version in the subgraph.

In at least some aspects, the high-performance graph traversal may include a freshness table. The freshness table may help determine if there is a change in data in the graph.

The high-performance graph traversal may maintain at least one subgraph of the graph when a graph traversal occurs to retrieve an entity. The traversal for a single entity results in a tree that describes the entity through its attributes and all related entities (and their attributes) up to a pre-configured depth (up to six levels, for example). In at least some aspects, the subgraph may be translated and displayed as a search result on a search result page.

In at least some aspects, the freshness table may contain sets of key-value pairs, where the key may include an entity identifier and the value may be a map of predicates to a map of source to list of versions. The freshness table may contain deletion tags to specific data to indicate whether specific versions of the data has been deleted. The freshness table data may be stored in a flat data structure. For example, a serialization format for the value of the freshness table may be "prediate$SourceContext$CommaSeparatedVersionNumbers." The data structure of the freshness table may map respective sources to available versions of data. A deletion may be tagged with a "true" value for specific versions of data that is deleted. Entries in the freshness table may accurately indicate available versions of data in entities in the graph without traversing the graph to look up respective entities. In some aspect, the freshness table may be updated each time the graph is updated. The simple data structure of the freshness table may maintain its light-weight operation with a minimal additional processing requirement in updating the graph.

In at least some aspects, maintaining the subgraph while adding data to the graph may include the following steps: updating the freshness table with a new version of data from the payload of update request data, checking the freshness table and the source configuration which version to use when the subgraph traversal reaches the entity node, and fetching data from the graph when the existing version of data in the subgraph from the last graph traversal for the entity differs from the version in the freshness table or when the data is not present in the subgraph.

In at least some aspects, maintaining the subgraph while deleting data from the graph may include the following steps: updating the freshness table by tagging the version as being deleted, determine a version of data to use by checking the freshness table and the source configuration when the graph traversal reaches the entity node being deleted, and fetching the data from the graph to update the subgraph when the existing version of data in the subgraph from the last traversal matches the deleted version.

In at least some aspects, a roll-forward and roll-back of source to a different version may include the following steps: updating the source configuration to roll-forward to the different version, checking a version to use based on a list of available versions in the source configuration, and fetching data from the graph to update the subgraph when the existing version in the subgraph from the last traversal is older than the version as indicated in the freshness table and the source configuration.

In at least some aspects, updating the query configuration that defines graph traversal paths may include the following steps: looking up a new node that is not included in the query configuration, fetching the data from the graph upon the graph traversal, and ignoring the node for fetching if the node is already included in the query configuration.

In at least some aspects, the high-performance graph traversal may provide a single graph traversal method that serve all the above mentioned tiers of data with varying requirements. For example, the method may provide nearly five times as much throughput as the full top-down traversal. The use of the subgraph along with the freshness table, the query configuration, and the source configuration may result in reduction of access to the graph store by eleven times. The method may improve latency for searching large entities from 1000 seconds to 40 seconds, for example. The method may also reduce a number of retries of traversals needed for large entities while generating the entities in the graph. Moreover, the continuous testing of implementing the methods as described shows consistency and correctness of data while handing changes in data and configurations.

FIG. 1 illustrates an overview of an example system for a graph traversing system in accordance with aspects of the present disclosure. System 100 may include one or more client computing devices 104 (e.g., client computing devices 104A and 104B) that may execute a client version of an information search application (e.g. a web search service application and a natural language voice recognition application). A graph database 130 from which facts may be retrieved by traversing the graph in the graph database 130. In some examples, the information search may execute locally on client computing devices 104A/B. In other examples, an information search application (e.g., a mobile app on a thin client computing device 104B) may operate in communication (e.g., via network 108) through a link 106B with a corresponding server version of the information search application 114 executing on one or more server computing devices, e.g., server computing device 112 (also 110A and 110B). In still other aspects, rather than executing a client version of an information search application, the one or more client computing devices 104A-B, used respectively by users 102A-B, may remotely access, e.g., via a browser connecting to the network 108 via links 106A-B, the information search application 114. The information search application 114 may be implemented on the server computing device 112 or multiple server computing devices 110A and 110B connected to the Network 108 via links 106C/ 106D (e.g., in a distributed computing environment such as a cloud computing environment).

As illustrated by FIG. 1, a server version of an information search application 114 is implemented by server computing device 112. The server version of an information search application 114 may also be implemented in a distributed environment (e.g., cloud computing environment) across a plurality of server computing devices (not shown). Moreover, as should be appreciated, either a client or a server version of the information search application 114 may be capable of receiving a search query from a user (e.g., user 102A or 102B), search for information through the graph database 130 based on the query, generate and provide a list of information as a search result. While a server version of the information search application 114 is shown and described, this should not be understood as limiting. Rather, a client version of the information search application 114 may similarly implement the information search application 114 on a client computing device 104A (or 104B).

In at least some aspects, the one or more client computing devices 104 (104A and 104B) may be personal or handheld computers having both input elements and output elements operated by one or more users 102 (e.g., a user 102A and another user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing the information search application 114 may be utilized.

In at least some aspects, network 108 is a computer network such as an enterprise intranet, an enterprise extranet and/or the Internet. In this regard, the network 108 may include a Local Area Network (LAN), a Wide Area Network (WAN), the Internet, wireless and wired transmission mediums. In further aspects, server computing device 112 and other server computing devices 124A and 124B may communicate with some components of the system via respective links 106A-E to a local network (e.g., an enterprise intranet), whereas server computing device 112 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the information search application 114 may be implemented on a server computing device 112. In a basic configuration, the server computing device 112 may include at least a processing unit and a system memory for executing computer-readable instructions. In at least some aspects, the server computing device 112 may comprise one or more server computing devices in a distributed environment (e.g., cloud computing environment). The server computing device 112 may generate, store and/or access a graph database 130, a freshness table 132, a subgraph 134, a query configuration 136, and a source information 138. Some of the graphs and associated subgraphs and configurations may also be generated, stored and/or accessed by the one or more client computing devices 104 and/or one or more other server computing devices (e.g., server computing devices 124A and/or 124B) via network 106.

The graph database 130 may store facts in at least one graph. In at least some aspects, a graph may include entities (nodes) connected by links. An entity may be described as a part of a series of facts. Each fact is represented as a semantic triple based on the Resource Description Framework (RDF). A fact may include a subject, a predicate, an object, contexts, an update/deletion timestamp and other metadata. The metadata may include but not limited to market, confidence levels of facts, and rank. A subject may identify an entity/node in the graph. In at least some aspects, the graph may be generated after conflation of subjects from various sources with identifiers that identify respective nodes. A predicate may describe an attribute of the subject. For example, a predicate may be an age when the subject represents a person. The predicate links the subject to the object which contains the actual value. The object is an actual value for the property as defined by the predicate for a given subject that the predicate connects.

For example, the object may have a value of 25 years old when the subject represents a person and the predicate of the age links the subject and the object. When the object represents a literal value, the object describes a property of the entity. On the other hand, when the object is another subject, it describes a relationship to another entity. There may be two or more levels of linked nodes by linking three or more nodes with predicates. The graph may impose a maximum number of levels to maintain processing required within a predefined maximum steps during graph traversals.

The freshness table 132 may provide which versions of data from specific sources are available to be used for traversing specific entities the graph. In at least some aspects the freshness table 132 may contain sets of key-value pairs, where the key may include an entity identifier and the value may be a map of predicates to a map of source to list of versions. The freshness table 132 may contain deletion tags to specific data to indicate whether specific versions of the data has been deleted. Data for the freshness table 132 may be stored in a flat data structure. The data structure of the freshness table 132 may map respective sources to available versions of data. For example, a serialization format for the value of the freshness table 132 may be "prediate$Source-Context$CommaSeparatedVersionNumbers."

The subgraph 134 may be a partial graph of the graph as generated based on the graph in the graph database 130 as a result of a graph traversal that takes place to search for an entity from the graph. The subgraph 134 may include subjects, predicates, and objects, which are associated with the last graph traversal for the entity. In at least some aspects, data values in one or more of entities (i.e., the subjects and the objects) in the subgraph may become obsolete when new data values are ingested into the graph database after the last graph traversal for the entity. In at least some aspects, the freshness table 132 may be used to identify which entities in the subgraph 134 are obsolete by comparing version information stored in the freshness table 132 against the version information of entities in the subgraph 134. In at least some aspects, the subgraph 134 may be a collection of subgraphs as generated upon traversing the graph in search for different entities. Respective subgraphs may include a timestamp that indicates when the respective subgraphs have been generated upon the last graph traversal of the graph. For example, the black-filled entities in the graph in the graph database 130 corresponds to the entities in the subgraph 134 for illustration purposes.

The query configuration 136 provides which links to be used in traversing the graph in the graph database 130 and the subgraph 134. The query configuration 136 may be an XML (Extensible Mark-up Language) that defines a structure of a path to follow at each level of the graph traversal for a give type of entity. The query configuration 136 may limit the number of connections of a graph traversal.

The source configuration 138 may identify versions of data for use with each source at the time of a graph traversal. When a new version of data is ingested in the graph, use of the source configuration 138 enables a roll-forward and roll-back of versions of data. For example, the roll-forward of a version of data may be used to retrieve the latest version of data from the graph. On the other hand, the roll-back may be used to retrieve a previous version of data from the graph when the current version of data is determined to be unusable or unavailable.

The information search application 114 may include various components (components for retrieving a subgraph, determining a traversal path to traverse the graph, traversing the graph, identifying a node version of data to access, and updating the subgraph with the latest data, for example). In aspects each component may communicate and pass data between the other components. The various components may be implemented using hardware, software, or a combination of hardware and software. Moreover, the various components may be executed on a single server computing device (e.g., server computing device 112), on multiple server computing devices (e.g., server computing devices 112, 124A, 124B, and 130), or at least in part locally on one or more client computing device (e.g., client computing devices 104A and/or 104B).

As should be appreciated, the various methods, devices, components, etc., described with respect to FIG. 1 is not intended to limit the system 100 to being performed by the particular components described. Accordingly, additional topology configurations may be used to practice the methods and systems herein and/or components described may be excluded without departing from the methods and systems disclosed herein.

Figure 2:
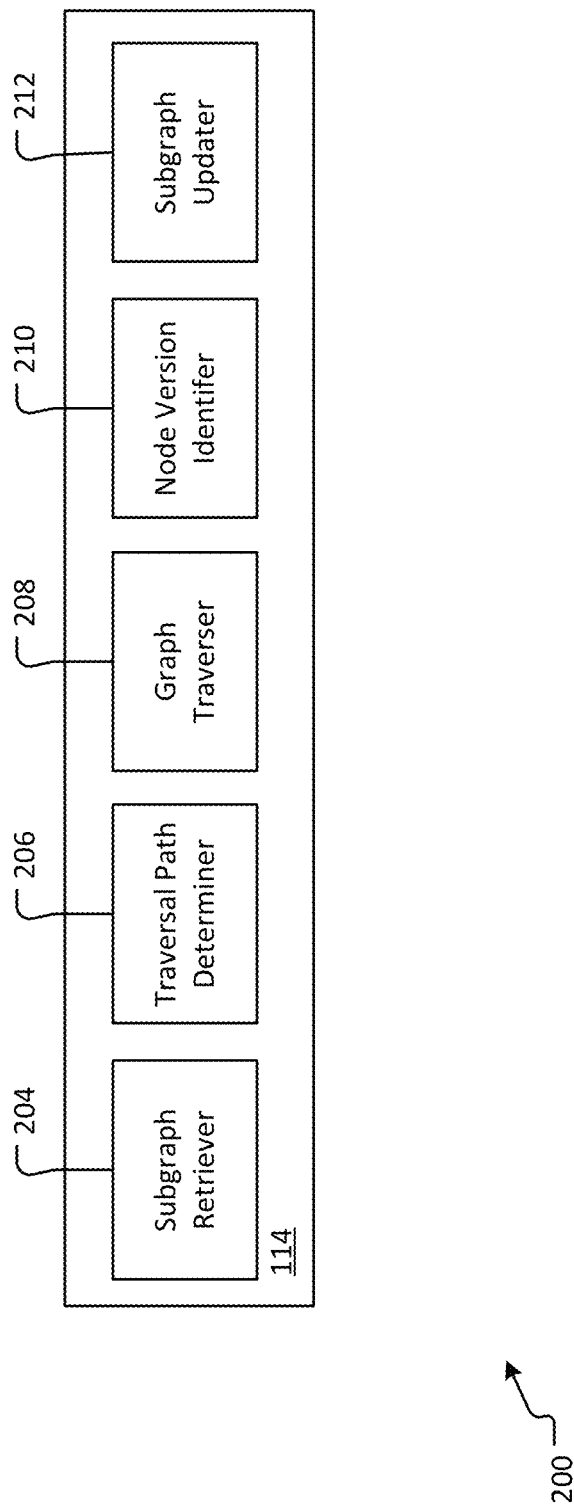
FIG. 2 illustrates an exemplary component diagram of a graph traversing system in accordance with aspects of the present disclosure.

FIG. 2 illustrates an exemplary component diagram of an information search system. In at least some aspects components of the information search system 200 may be implement on a server 112. The system 200 may include at least a subgraph retriever 204, a traversal path determiner 206, a graph traverser 208, a node version identifier 210, and a subgraph updater 212. Additionally or alternatively, one or more components of the information search system 200 may be implemented on the server 202 while other components are implemented in a user-specific computing device such as a client computing device (not shown in FIG. 2). In at least some aspects, the system 200 may also include a query receiver (not shown in FIG. 2) and a result provider (not shown in FIG. 2). The query retriever may receive a query that requests for an entity and/or information stored in the graph database 130. Examples of the query may include but not limited to adding an entity to the graph, deleting an entity from the graph, and retrieving an entity from the graph. The result provider may provide a result of traversing the graph and/or the subgraph.

The subgraph retriever 204 may retrieve a subgraph that is generated during the last traversal of the graph to search for the entity that is currently sought by the query. The subgraph may be a partial graph of the graph in the graph database 130. The partial graph may include one or more facts. Each fact is represented as a semantic triple based on the Resource Description Framework (RDF). A fact may include a subject, a predicate, an object, contexts, a update/deletion timestamp and other metadata. The metadata may include but not limited to market, confidence levels of facts, and rank. In at least some aspects, data values in one or more entities and/or a graph structure of the subgraph may be distinct from the data values of corresponding entities and/or a graph structure of the graph when specific entities in the graph is updated after the subgraph is generated.

The traversal path determiner 206 may determine a path for traversing a graph to reach an entity that is currently sought. In at least some aspects, the traversal path determiner 206 may look up a query configuration 136 and determine which links to follow to reach the entity in the subgraph and the graph within a predefined number of level of depths of the subgraph and the graph. For example, one subject entity may include thousands of predicates that connect to different objects to constitute respective facts. The traversal path determiner 206 may use data in the query configuration 136 to traverse the subgraph and the graph efficiently by selecting specific predicates to traverse facts leading up to the entity being sought.

The traversal path determiner 206 may also determine the path for traversing the graph based on data in the source configuration 138. In at least some aspects, the source configuration 138 may provide which version of data or entity needs to be used to traverse the graph. For example, the graph may include data for one or more versions of the entity. Some versions of data in the graph may be unavailable or unusable to maintain consistencies of facts stored in the graph. Updating some facts may require data in two or more entities for which data are provided by different sources. Data for facts may not necessarily be consistent until all the associated data are updated in the graph. Accordingly an older version of data may be used, for example. In at least some aspects, the subgraph may contain data with a version that is obsolete or unusable but the graph contains valid data according to the source configuration 138.

The graph traverser 208 may traverse the subgraph and fetch data from the graph when some of entities in the subgraph are obsolete or not usable. In at least some aspects, the graph traverser 208 may traverse the subgraph first top down according the traversal path as determined by the traversal path determiner 206. The graph traverser 208 may fetch specific entities from the graph by specifying entity identifiers for appropriate versions of data as provided by the source configuration 138. In at least some aspects, traversing the subgraph may be more efficient in terms of performance speed and memory resource requirement because the subgraph is much smaller in size than the graph. For example, a traversal operation may include traversing the subgraph without traversing or fetching an entity from the graph when the subgraph includes all the appropriate versions of the entities, which makes the traversing operations sufficient to be contained in the subgraph without having a need to fetch data from the graph.

The node version identifier 210 may identify a version of a node or an entity that the graph traverser 208 reaches during the traversal of the subgraph. The node version identifier 210 may use the freshness table and the source configuration 138 to determine versions of data to use. In at least some aspects, the freshness table provides information about sources and availability statuses of versions of the data for entities as specified by entity identifiers and predicates. The node version identifier 210 may look up the availability status by specifying an entity and a predicate as provided by the graph traverser 208. Based on the availability status, the node version identifier 210 identifies which specific version to use for the specified entity.

The subgraph updater 212 may update data in entities of the subgraph. In at least some aspects the subgraph updater 212 may receive from the node version identifier 210 a specific version of data of an entity to be updated. The subgraph updater 212 fetches data from the graph by accessing an entity of the graph based on the entity identifier and a predicate along with a version number. The subgraph updater 212 may update the subgraph using the fetched data.

As should be appreciated, the various methods, devices, components, etc., described with respect to FIG. 2 is not intended to limit example of the information search system 200. Accordingly, additional topology configurations may be used to practice the methods and systems herein and/or components described may be excluded without departing from the methods and systems disclosed herein.

Figure 3:
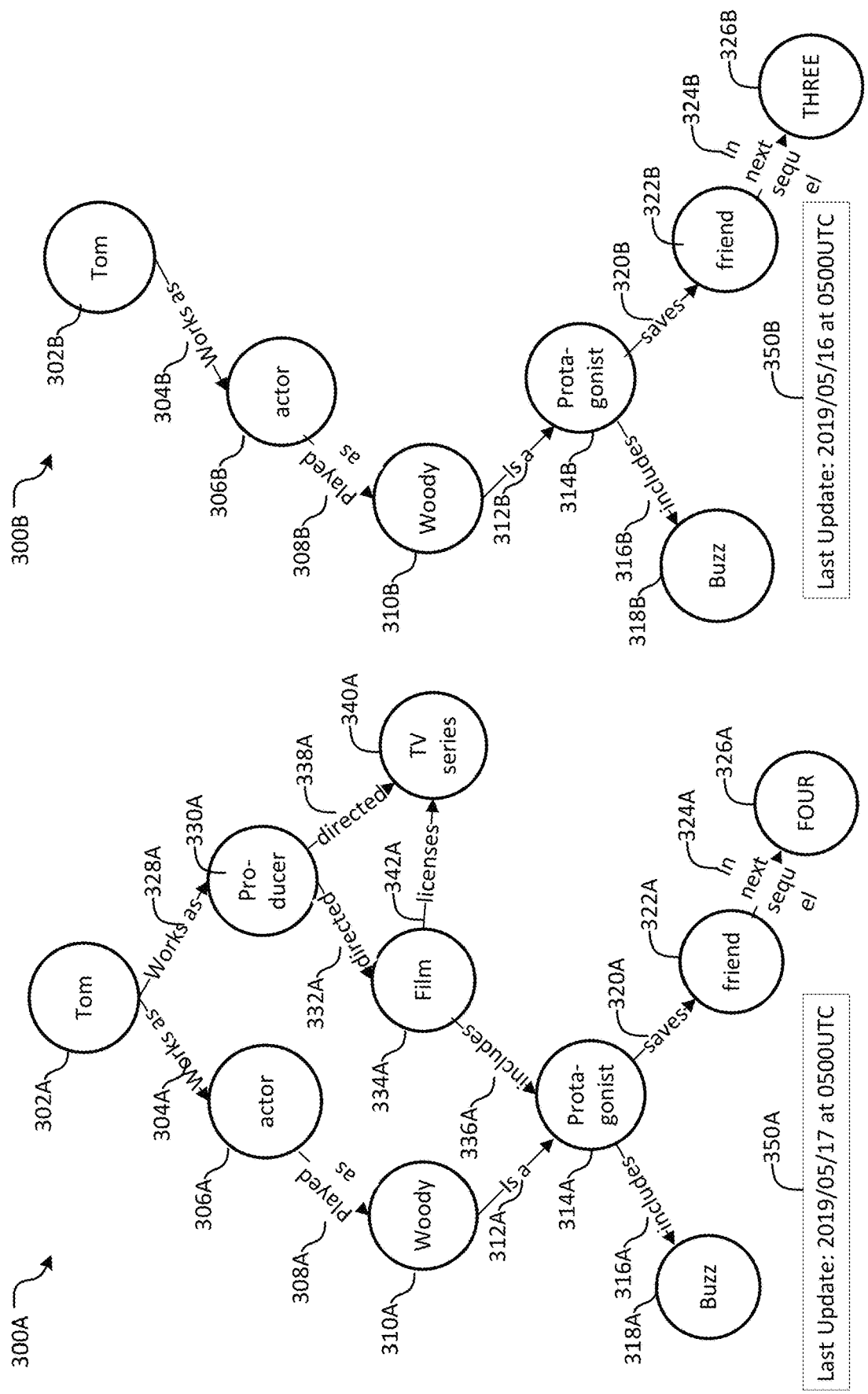
FIGS. 3A/3B illustrate examples of a graph database and its subgraph based on the previous search according to an example system in accordance with aspects of the present disclosure.

FIGS. 3A/3B illustrate examples of a graph in a graph database and its subgraph based on the previous search according to an example system in accordance with aspects of the present disclosure. FIG. 3A illustrates a graph 300A according to the example system in accordance with aspects of the present disclosure. The graph 300A has the last update time stamp 350A of 2019/05/17 at 0500 UTC.

In FIG. 3A, the graph 300A as an example includes facts based on nodes and links. In this scenario example, Tom has two professions as an actor and a producer. Tom played a role of Woody which is a protagonist along with Buzz, saving a friend. The friend is in the next sequel of the story FOUR. Tom as a producer directed both a film and TV series as the film licenses rights to the TV series. The film includes a protagonist. In the graph, the entity 302A is a root or top entity and has a value "Tom" and two predicates as links. Both of the two predicates are the "Works as" predicates 304A and 328A. The "Works as" predicate 304A links the "Tom" subject entity 302A to the "actor" object entity 306A. The set of the subject, the predicate, and the object, collectively constitute a fact: "Tom works as an actor." The object entity 306A is also a subject entity of another fact: "an actor played as Woody." The predicate "played as" 308A connects the "actor" entity 306A to the "Woody" object entity 310A. The Woody entity 310A is also a subject entity of another fact: "Woody is a protagonist" by the "is a" predicate 312A connecting the "Woody" entity 310A to the "protagonist" entity 314A. Similarly, the graph 300A contains additional facts: "a protagonist includes Buzz" by the entities 314A and 318A with the "includes" predicate 316A; "a protagonist saves a friend," by the entities 314A and 322A with the "saves" predicate 320A; "a friend is in the next sequel FOUR," by the entities 322A and 326A with the "in next sequel" predicate 324A; "Tom works as a producer," by the entities 302A and 330A with the "works as" predicate 328A; "a producer directed a film," by the entities 330A and 334A with the "directed" predicate 332A; "a film includes a protagonist," by the entities 334A and 314A with the "includes" predicate 336A; "a producer directed TV series," by the entities 330A and 340A with the "directed" predicate 338A; and "a film licenses to TV series," by the entities 334A and 340A with the "licenses" predicate 342A.

FIG. 3B illustrates an example of a subgraph 300B based on the graph 300A under the same scenario example as in FIG. 3A. Here, the subgraph 300B may generated as a result of a graph traversal on the graph 300A to search a next sequel of the story that the friend that a protagonist Woody as played by Tom as an actor appears. The subgraph 300B has a last update timestamp 350B of 2019/05/16 at 0500UTC. In the example, the last update time stamp 350B of the subgraph 300B is older than the last update time stamp 350A of the graph because a value of the entity 326A in the graph 300B is updated from "THREE" to "FOUR" after the subgraph 300B is generated.

In the subgraph 300B, the entity 302BA is a root or top entity and has a value "Tom" and two predicates as links. Both of the two predicates are the "Works as" predicates 304B and 328B. The "Works as" predicate 304B links the "Tom" subject entity 302B to the "actor" object entity 306B. The set of the subject, the predicate, and the object, collectively constitute a fact: "Tom works as an actor." The object entity 306B is also a subject entity of another fact: "an actor played as Woody." The predicate "played as" 308B connects the "actor" entity 306B to the "Woody" object entity 310B. The Woody entity 310B is also a subject entity of another fact: "Woody is a protagonist" by the "is a" predicate 312B connecting the "Woody" entity 310B to the "protagonist" entity 314B. Additionally the subgraph 300B provides "a protagonist includes Buzz" by the entities 314B and 318B with the "includes" predicate 316B; "a protagonist saves a friend," by the entities 314B and 322B with the "saves" predicate 320A; and "a friend is in the next sequel THREE," by the entities 322B and 326B with the "in next sequel" predicate 324B.

In at least some aspects each entity may include metadata such as a version number of data in the entity in the graph 300A and the subgraph 300B (not shown in FIGS. 3A/3B). For example, a version number of data the object entity 326A in the graph 300A may be four while a version number of the data in the object entity 326B in the subgraph 300B may be three. This example indicates that data value "FOUR" in the object entity 326A is newer in version than the data value "THREE" in the object entity 326B.

As should be appreciated, the various methods, devices, components, etc., described with respect to FIG. 3A/3B is not intended to limit example of the graph and the subgraph. Accordingly, additional topology configurations may be used to practice the methods and systems herein and/or components described may be excluded without departing from the methods and systems disclosed herein.

Figure 4:
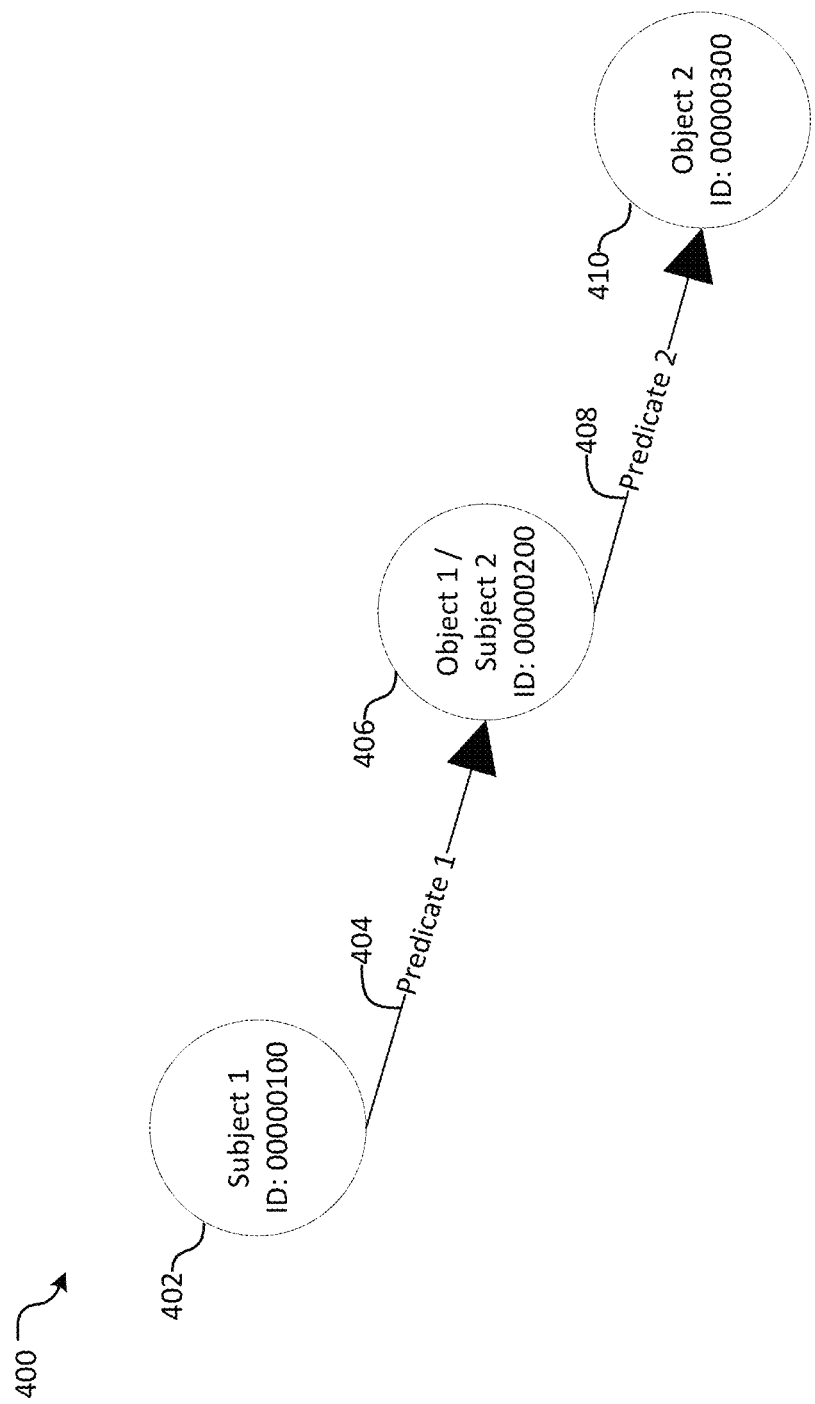
FIG. 4 illustrates an exemplary structure of a fact according to an example system in accordance with aspects of the present disclosure.

FIG. 4 illustrates an exemplary structure of a fact according to an example system in accordance with aspects of the present disclosure. The graph data structure 400 illustrates an example of two aggregated facts. A first of the two facts is, for example, a set of "Subject 1" as a subject and "Object 1" as an object with "Predicate 1" as an object. Accordingly, a "Subject 1" entity 402 may include a value "subject 1" and an entity identifier 00000100. A "Predicate 1" predicate 404 connect the "Subject 1" entity 402 with the entity 406 with value "Object 1/Subject 2" with an entity identifier 00000200. In addition to the entity 406 being an object to the first fact, the entity 406 is also a subject to the second fact, which is a set of "Subject 2" as a subject and "Object 2" as an object with "Predicate 2" as an object. Accordingly, the "Predicate 2" predicate 408 connects the entity 406 with the "Object 2" entity 410 having an entity identifier of 00000300.

As should be appreciated, the various methods, devices, components, etc., described with respect to FIG. 4 is not intended to limit example of the graph data structure 400. Accordingly, additional topology configurations may be used to practice the methods and systems herein and/or components described may be excluded without departing from the methods and systems disclosed herein.

FIGS. 5A-5C illustrate data structures with which the disclosure may be practiced in accordance with aspects of the present disclosure. The data structure 500A in FIG. 5A illustrates an example of the freshness table 132. The data structure 500B in FIG. 5B illustrates an example of the source configuration 138. The data structure 500C in FIG. 5C illustrates an examples of the query configuration 136.

The data structure 500A in FIG. 5A illustrates an example of the freshness table 132. The freshness table 132 has a last update timestamp 502 of 2019/05/17 at 0500UTC. As an example, the timestamp is the same as the last update timestamp 350A of the graph. Identifier 504 may identify an entity in the graph by an entity identifier. Predicate 506 may indicate a predicate that is associated with the entity with the entity identifier. A combination of the identifier 504 and the predicate 506 may constitute a key for the freshness table 132. Source 508 may indicate a source that provides data for the entity. Versions and deleted flags 510 may include a list of versions based on version numbers and flags for respective versions indicating whether the data for the version has been deleted. The value of the flags is true when the data is deleted, for example.

The data structure 500A includes two entries. First is an entity with an entity identifier 504 of 00000100 with "work as" as a predicate 506, having "source001" as a source 508. There are three versions, 1, 2, and 3, for this data, and the deleted flags indicate "True" for versions 1 and 2 and "False for version 3. That is, the data for version 3 is the latest version of data and still remains in the graph. The second is an entity with an entity identifier 504 of Ser. No. 00/000,200, "in next sequel" as a predicate 506, having "source 002" as a source 508. The second entry indicates four versions of data where data for the first three versions have been deleted and the fourth version (the latest) version of data is stored in the graph.

The data structure 5B is an example data table of the source configuration 138. The data structure 5B has the last update timestamp of 2019/05/17 at 0500UTC, which is the same time as by the last update timestamp of the graph 300A. As an example, the source configuration 138 may include two columns: source 522 that indicates a source and "version to use" 524 that provide a version number of data to use. For example, the source configuration 138 contains two entries: the first entry indicating "source001" as a source with 3 as a version to use 524, and the second entry indicating "source002" with the latest version number of 4.

The data structure 5C is an example data table for the query configuration 136. The data structure 5C has the last update timestamp of 2019/05/17 at 0500UTC, which is the same as the last update timestamp of the graph 300A and the last update timestamps of the freshness table 132 in FIG. 5A and the source configuration 138 in FIG. 5B. The example data table for the query configuration 136 may indicate a type of entity 542, a maximum level of the graph 544, and a structure to follow 546. The query configuration 136 may be an XML (Extensible Mark-up Language) that defines a structure of a path to follow at each level of the graph traversal for a give type of entity. The query configuration 136 may limit the number of connections of a graph traversal.

As should be appreciated, the various methods, devices, components, etc., described with respect to FIGS. 5A, 5B, and 5C are not intended to limit example of the data structures 500A-500C. Accordingly, additional topology configurations may be used to practice the methods and systems herein and/or components described may be excluded without departing from the methods and systems disclosed herein.

Figure 6:
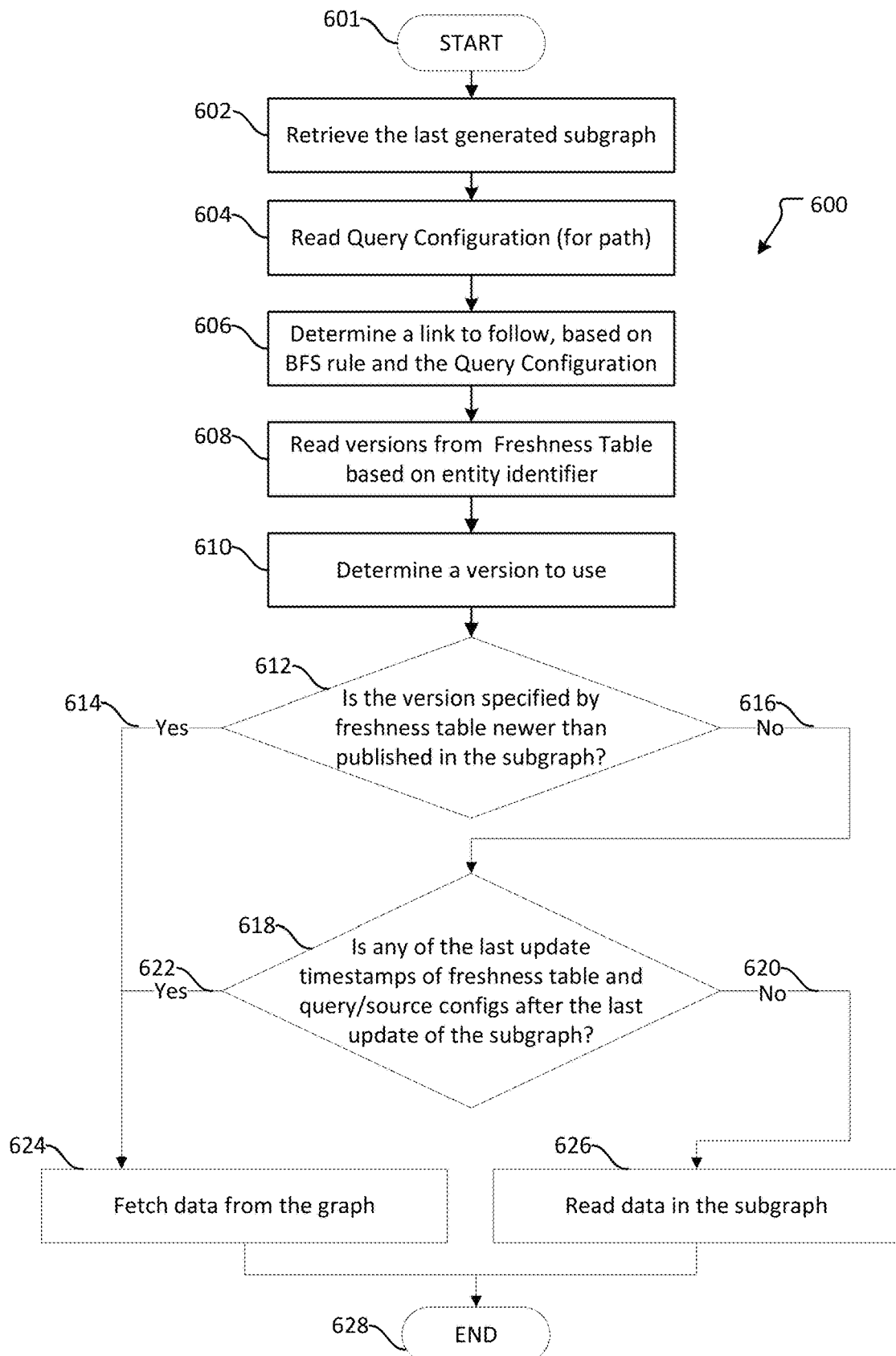
FIG. 6 illustrates an example method of traversing a graph database according to an example system with which the disclosure may be practiced in accordance with aspects of the present disclosure.

FIG. 6 illustrates an example of method 600 of traversing a graph database according to an example system with which the disclosure may be practiced in accordance with aspects of the present disclosure. A general order for the stages of the method 600 is shown in FIG. 6. Generally, the method 600 starts with a start operation 601 and ends with an end operation 628. The method 600 can include more or fewer stages or can arrange the order of the stages differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, a FPGA, a SOC, or other hardware device. Hereinafter, the method 600 shall be explained with reference to the systems, component, devices, modules, software, data structures, data characteristic representations, signaling diagrams, methods, etc. described in conjunction with FIGS. 1-5 and 7-11.

The retrieve operation 602, by the subgraph retriever 204, for example, may retrieve the last generated subgraph. The subgraph may be as illustrated in the subgraph 134 in FIG. 1 with an example subgraph 300B in FIG. 3B. In at least some aspects, there may be a receive operation (not shown in FIG. 6) preceding the retrieve operation 602 to receive an entity as represented by an entity identifier along with a predicate. The retrieve operation 602 provides subgraph data.

The read operation 604, by the traversal path determiner 206 for example, may read a query configuration 136. In at least some aspects, reading the query configuration 136, the query configuration 136 in FIG. 1 with a data structure 500C in FIG. 5C for example, may provide a path for traversing the subgraph (the graph 300A and the subgraph 300B as examples.)

The determine operation 606, by the traversal path determiner 206, may determine a link to follow, based on the breadth first rule (BFS) and the query configuration 136. In at least some aspects, the determine operation 606 may include the subgraph traversal by the graph traverser 208 for example. Accordingly, an entity with an entity identifier may be obtained from the subgraph.

The read operation 608, by the node version identifier 210 for example, may read versions from the freshness table 132 based on an entity identifier of the entity. An example of the freshness table 132 may be as indicated by the freshness table 132 with an example data structure 500A. The determine operation 610, by the graph traverser 208 for example, determines a version of data to use for the graph traversal. In addition to accessing version information in the freshness table 132, the read operation 608 may read the source configuration 138 in FIG. 1 with a data structure 500B in FIG. 5B for example to determine a version to use to access data in the source configuration table.

The decision operation 612 decides whether the version as specified by the freshness table 132 newer than the data as published in the subtree. In at least some aspects, the decision operation 612 may be performed by the graph traverser 208 and/or subgraph updater 212. For example, the data structure 500A in FIG. 5A for the freshness table 132 indicates that the latest version of the entity with an identifier 00000200 with a predicate "in next sequel" is 4. The deleted flags 510 of False on version 4 shows that the version 4 data has not been deleted while data from other versions (1, 2, and 3) have been deleted. The corresponding entity 326B in the subgraph 300B is version 3, for example. That is, the freshness table 132 indicates that the entity 326A in the graph 300A contains the latest version (4) of data value "FOUR," which is newer than the data value "THREE" in the entity 326B in the subgraph 300B.

The read operation 626 may use data on the subgraph without updating the subgraph when the version in the freshness table 132 is not newer than the version of data in the subgraph in the decision operation 612. Accordingly the data from the entity from the subgraph may be provided as a result of the search in the use operation 626.

If the version of data as specified by the freshness table 132 is newer than the version of data in the subgraph in the decision operation 612 (following the "Yes" flow 614), the fetch operation 624 may fetch data in the corresponding entity from the graph. For example, the fetch operation may read data value "FOUR" from the entity 326A in the graph 300A and replace the data value "THREE" in the entity 326B in the subgraph 300B.

If the decision operation 612 results in "NO" 616, then the decision operation 618 may decide if any of the last update timestamps of the freshness table 132, the query configuration 136, and the source configuration 138, after the last update timestamp of the subgraph. For example, the decision operation 618 may look up the last update timestamp 502 of the data structure 500A of the freshness table in FIG. 5A, the last update timestamp 520 of the data structure 500B of the source configuration 138 in FIG. 5B, the last update timestamp 540 of the data structure 500C of the query configuration 136 in FIG. 5C, and the last update timestamp 350B of the subgraph 300B. In some other aspect, the decision operation 618 may look up the last update timestamp 350A of the graph 300A. When the decision operation 612 results in "YES" 614, the fetch operation 624 may fetch data from the graph 300A.

If the decision operation 618 results in "YES" 622 (i.e., any of the last update timestamps of the freshness table 132 and the two configurations is not after the last update of the subtree), the fetch operation 624 may fetch data from the graph entity that corresponds to the entity in the subgraph. In the example, the timestamps (2019/05/16 at 0500UTC) of the freshness table 132 and the two configurations is later than the last update timestamp (2019/05/16 at 0500UTC) of the subgraph. Accordingly, the fetch operation may read data value "FOUR" from the entity 326A in the graph 300A and replace the data value "THREE" in the entity 326B in the subgraph 300B. When the decision operation 618 results in "NO" 620, the read operation 626 may read data from the subgraph.

As should be appreciated, operations 602-626 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 7A-7D illustrate examples of methods of processing a graph database according to an example system with which the disclosure may be practiced in accordance with aspects of the present disclosure.

Figure 7A:
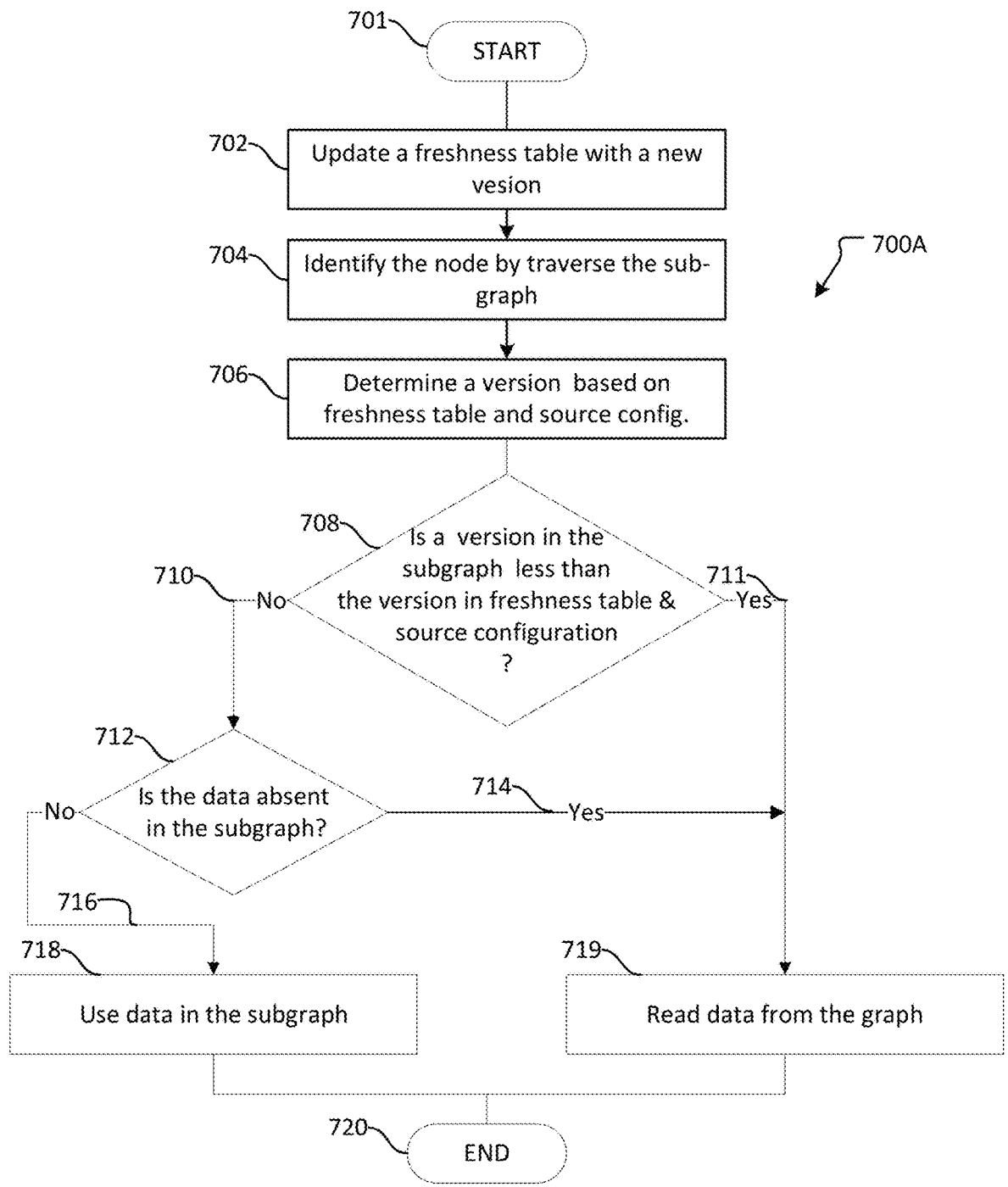
FIGS. 7A-7D illustrate examples of methods of processing a graph database according to an example system with which the disclosure may be practiced in accordance with aspects of the present disclosure.

FIG. 7A illustrates an example method 700A of adding data in the subgraph. Generally, the method 700A starts with a start operation 701 and ends with an end operation 720. The method 700A can include more or fewer stages or can arrange the order of the stages differently than those shown in FIG. 7A. The method 700A can be executed as a set of computer-executable instructions executed by a computer system and encoded or stored on a computer readable medium. Further, the method 700A can be performed by gates or circuits associated with a processor, an ASIC, a FPGA, a SOC, or other hardware device. Hereinafter, the method 700A shall be explained with reference to the systems, component, devices, modules, software, data structures, data characteristic representations, signaling diagrams, methods, etc. described in conjunction with FIGS. 1-6 and 7B/C-11.

The update operation 702 updates a freshness table 132 by tagging the version of data to delete. For example, in the data structure 500A in FIG. 5A of the freshness table 132, a deleted flag of a version of data in a specific entry may be set to "TRUE." The identify operation 704, by the node version identifier 210 for example, may identify the node or the entity by traversing the subgraph, the subgraph 134 and the example subgraph 300B for example. Then the determine operation 706 may determine a version to delete based on the freshness table 132 and the source configuration 138. An example of the freshness table 132 may be the data structure 500A as shown in FIG. 5A and an example of the source configuration 138 may be the data structure 500B as shown in FIG. 5B.

The decision operation 708 may decide whether a version in the subgraph is less than (i.e., older than) the version of data in the freshness table 132 and the source configuration 138. If the version of data in the subgraph is older than the version of data in the freshness table 132 and the source configuration 138 ("YES" 711), then data from the graph may be read (per the read operation 719) to update the value of the entity in the graph. In at least some aspects, the decision operation 708 may decide "Yes" 711 when data is not present in the entity of the subgraph, and the read operation 719 may read data from the graph. If the decision operation 708 decides "No" (i.e., the version of data in the subgraph is not less than the version in the freshness table 132 and the source configuration 138), the flow 710 leads to the decision operation 712.

The decision operation 712 decides whether the data is absent in the node or the entity in the subgraph. If the data is absent (i.e., not present) in the subgraph (the "Yes" flow 714), then the read operation 719 reads data from the corresponding entity in the graph. In at least some aspects, the corresponding entity may be specified at least by an entity identifier used to look up the freshness table 132. When the data is not absent (i.e., present) in the subgraph (the "No" flow 716), the data in the entity in the subgraph is used as the use operation 718 may use data in the subgraph 300B.

Figure 7B:
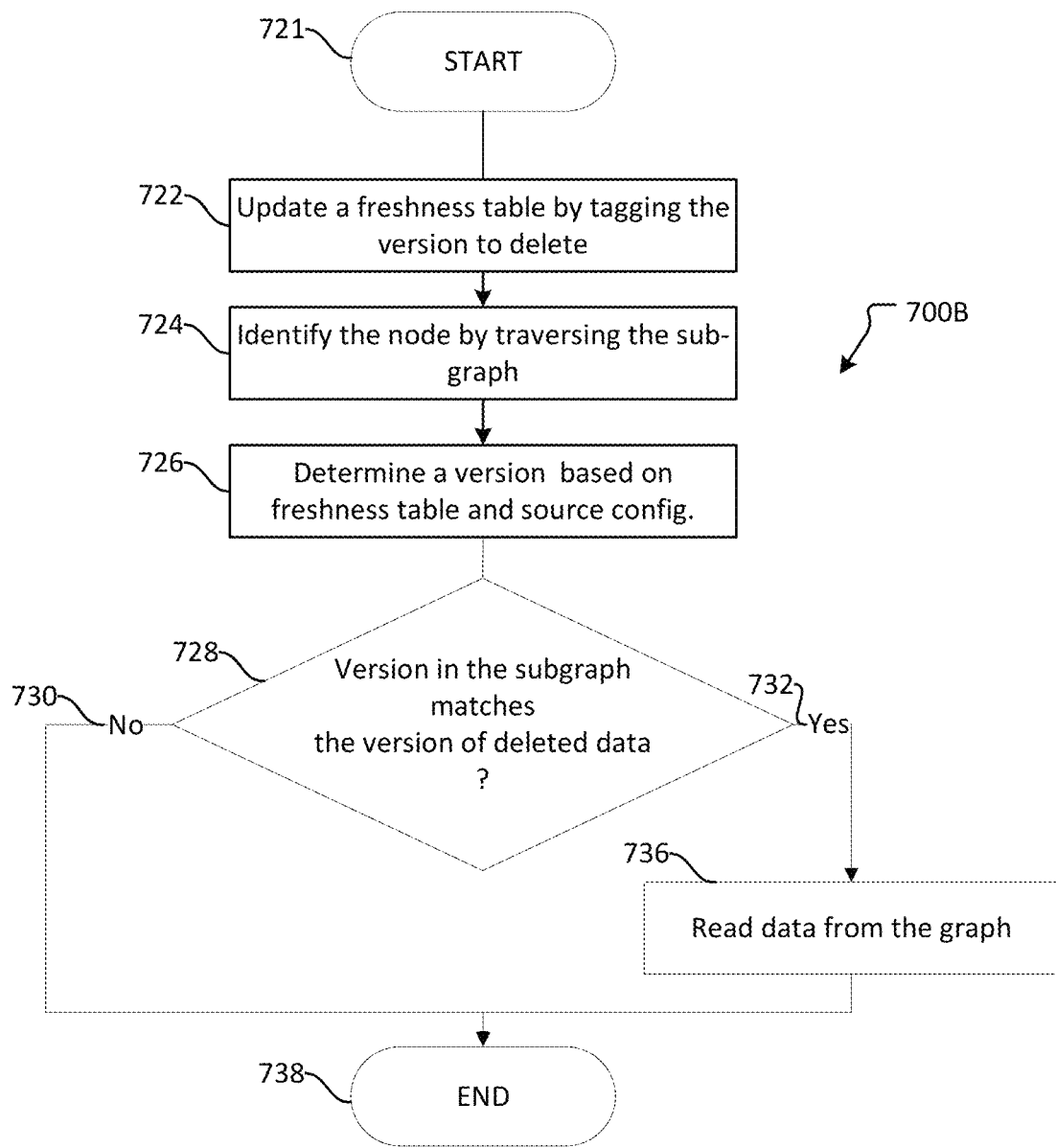

FIG. 7B illustrates an example method 700B of updating the subgraph based on deleting data from the graph. Generally, the method 700B starts with a start operation 721 and ends with an end operation 738. The method 700B can include more or fewer stages or can arrange the order of the stages differently than those shown in FIG. 7B. The method 700B can be executed as a set of computer-executable instructions executed by a computer system and encoded or stored on a computer readable medium. Further, the method 700B can be performed by gates or circuits associated with a processor, an ASIC, a FPGA, a SOC, or other hardware device. Hereinafter, the method 700B shall be explained with reference to the systems, component, devices, modules, software, data structures, data characteristic representations, signaling diagrams, methods, etc. described in conjunction with FIGS. 1-7A and 7C-11.

The update operation 722 may update a freshness table 132 by tagging the version of data to delete from the graph. The update operation 722 may be performed by the node version identifier 210 by using the freshness table 132 with a data structure 500A for example. The identify operation 724 may identify the node or the entity for which data is for deletion by traversing the subgraph. Additionally or alternatively, the traversal may be on the graph. The traversal may be performed by the graph traverser 208 on the subgraph 134 or the graph 130 for example. The example structures of the graph and the subgraph are as shown in the graph 300A and the subgraph 300B. The determine operation 726 may determine a version of data for deletion based on the freshness table 132 and the source configuration 138. The determination operation 726 may be performed by the node version identifier 210 for example. The decision operation 728 may decide whether the version in the subgraph matches the version for deletion. For example a version in the subgraph may be older than the version of data that has been deleted. If the decision operation is "Yes" (the "Yes" flow 732) where the version of data in the subgraph matches the version of deleted data, the read operation 736 reads data from the newer version of the data from the graph. For example, a data value "FOUR" from the entity 326A with the newer version is read from the graph 300A for updating the entity 326B of the subgraph 300B. If the decision operations decides "No" (the "No" flow 730), then the version of data in the subgraph is not changed.

Figure 7C:
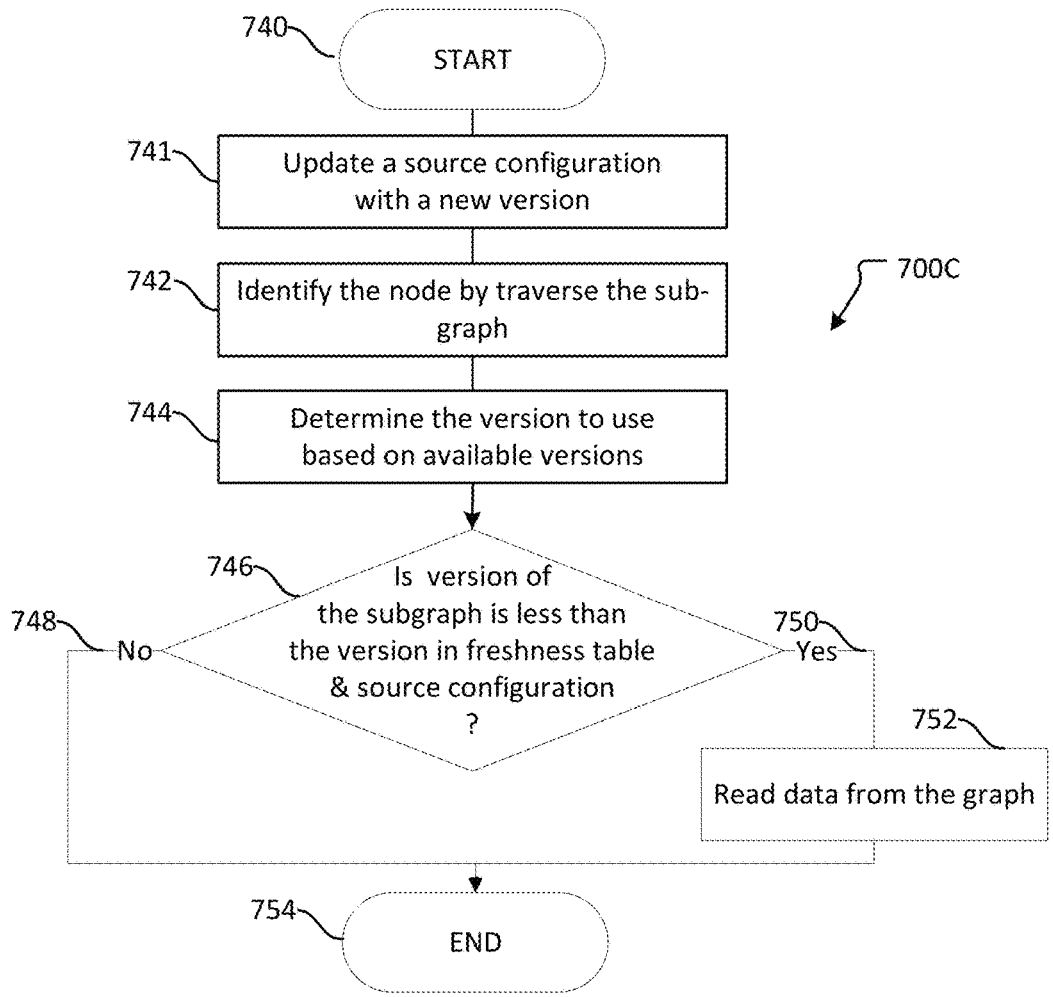

FIG. 7C illustrates an example method 700C of rollforward/roll-back operation by the source to a different version of data in the subgraph. Generally, the method 700C starts with a start operation 740 and ends with an end operation 754. The method 700C can include more or fewer stages or can arrange the order of the stages differently than those shown in FIG. 7C. The method 700C can be executed as a set of computer-executable instructions executed by a computer system and encoded or stored on a computer readable medium. Further, the method 700C can be performed by gates or circuits associated with a processor, an ASIC, a FPGA, a SOC, or other hardware device. Hereinafter, the method 700C shall be explained with reference to the systems, component, devices, modules, software, data structures, data characteristic representations, signaling diagrams, methods, etc. described in conjunction with FIGS. 1-7B and 7D-11.

The update operation 741 updates a source configuration 138 with a new version of data. The update operation 741 may be performed by the node version identifier 210 on the data structure 500B of the source configuration 138 as shown in FIG. 5B for example. The identify operation 742 identifies the target node/entity by traversing the subgraph. The identify operation 742 may be performed by the graph traverser 208 traversing the subgraph 134 for example. The determine operation 744 determines the version to use based on available versions on the freshness table 132 and the source configuration 138. The determine operation 744 may be performed by the node version identifier 210 by accessing the freshness table 132 and the source configuration 138 for example. The decision operation 746 decides whether the version of data in the subgraph is less than (older than) the version of data in the freshness table 132 and the source configuration 138. The decision operation 746 may be performed by the subgraph updater 212 for example.

If the decision operation 746 results in "YES" (the flow 750), then the read operation 752 reads data from the corresponding entity in the graph for rolling-forward or rolling-back a version of data in the subgraph. The update to the subgraph may be performed by the subgraph updater 212 to the subgraph 134 for example. Otherwise (the "No" flow 748), then data is not changed.

Figure 7D:
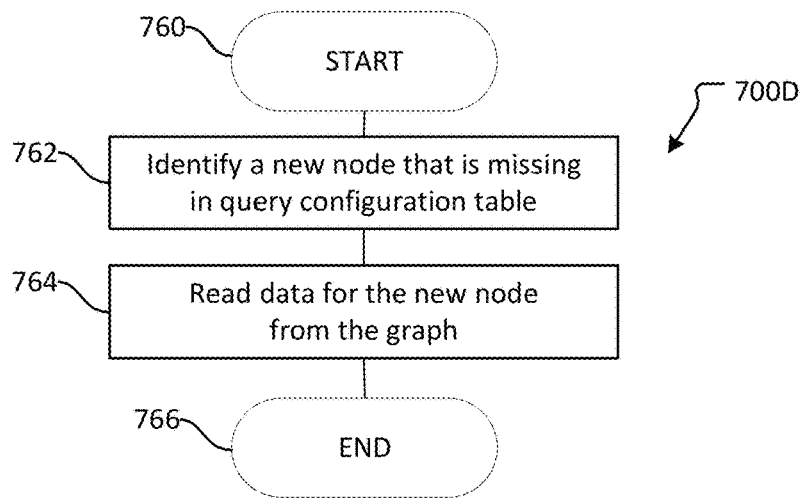

FIG. 7D illustrates an example method 700D of updating the subgraph when there is an update to a query configuration 136 according to an example system with which the disclosure may be practiced in accordance with aspects of the present disclosure. In at least some aspects, the query configuration 136 may define at least one path if available for a graph traversal. Generally, the method 700D starts with a start operation 760 and ends with an end operation 766. The method 700D can include more or fewer stages or can arrange the order of the stages differently than those shown in FIG. 7D. The method 700D can be executed as a set of computer-executable instructions executed by a computer system and encoded or stored on a computer readable medium. Further, the method 700D can be performed by gates or circuits associated with a processor, an ASIC, a FPGA, a SOC, or other hardware device. Hereinafter, the method 700C shall be explained with reference to the systems, component, devices, modules, software, data structures, data characteristic representations, signaling diagrams, methods, etc. described in conjunction with FIGS. 1-7C and 8-11.

The identify operation 762 may identify a new node/entity that is missing in a graph structure as recorded in the query configuration 136 table when the query configuration 136 is updated. The identify operation 762 may be performed by the traversal path determiner 206 using the query configuration 136, which data structure is shown in a data structure 500C of the query configuration 136 as shown in FIG. 5C for example. The read operation 764 may read data for the new node/entity from the graph for updating the subgraph.

As should be appreciated, operations 701-766 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
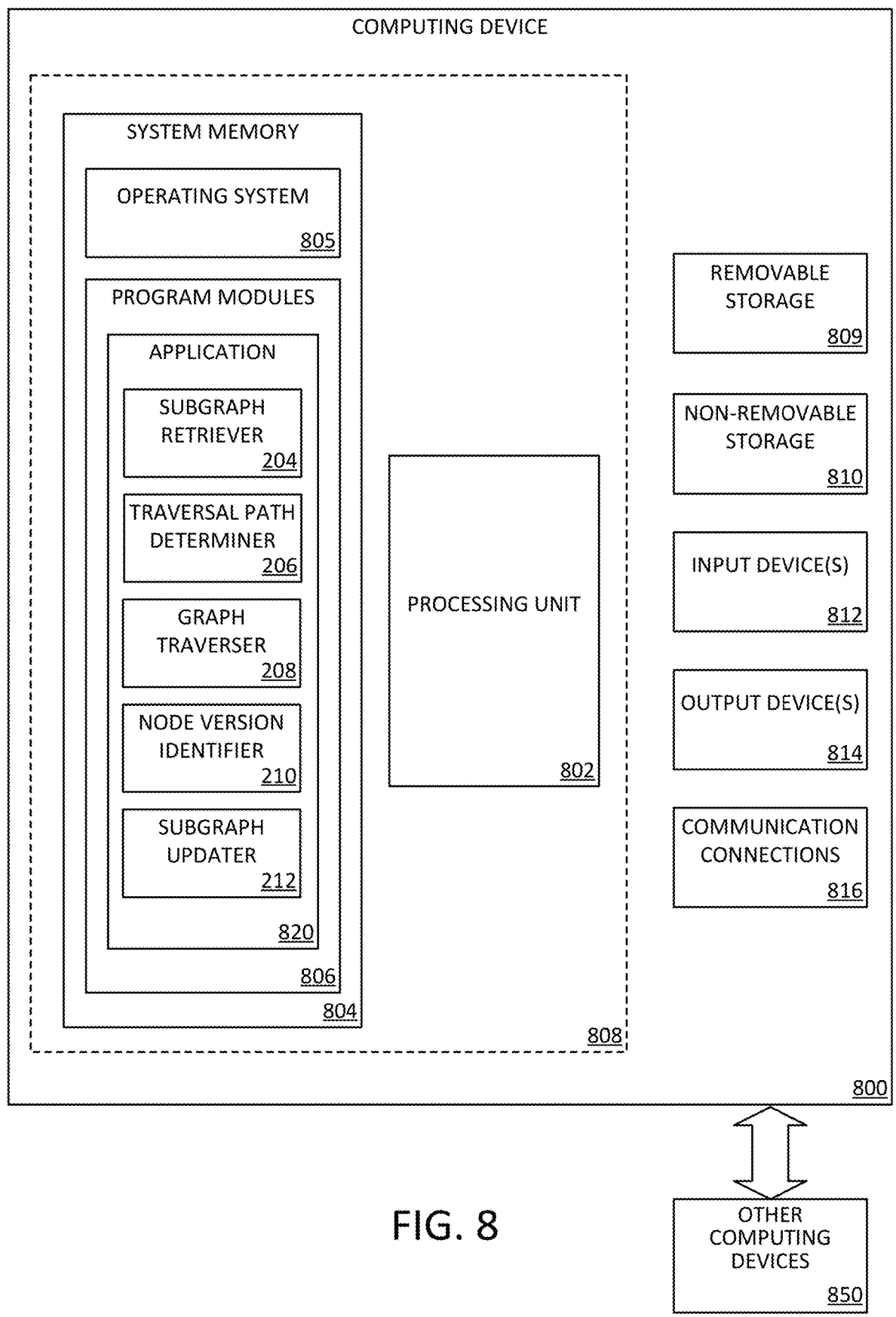
FIG. 8 is a block diagram illustrating example physical components of a computing device with which aspects of the disclosure may be practiced in accordance with aspects of the present disclosure.

FIG. 8 is a block diagram illustrating physical components (e.g., hardware) of a computing device 800 with which aspects of the disclosure may be practiced. The computing device components described below may be suitable for the computing devices described above, including the client computing devices 104A-B and the server computing devices 114 and 124A-B. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a subgraph retriever 204, a traversal path determiner 206, a graph traverser 208, a node version identifier 210, and a subgraph updater 212. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
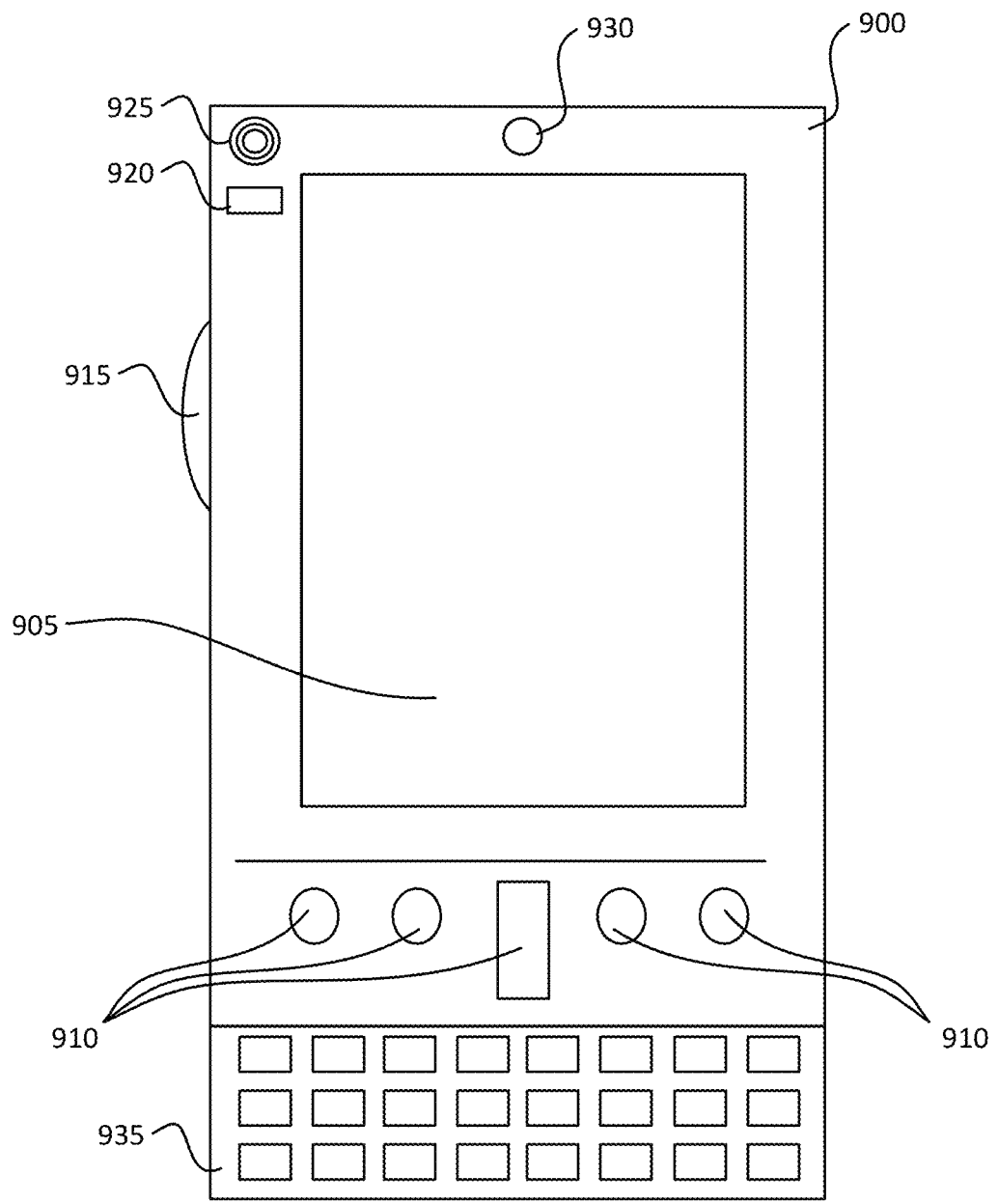
FIGS. 9A and 9B are simplified block diagrams of a mobile computing device with which aspects of the present disclosure may be practiced in accordance with aspects of the present disclosure.
Figure 9B:
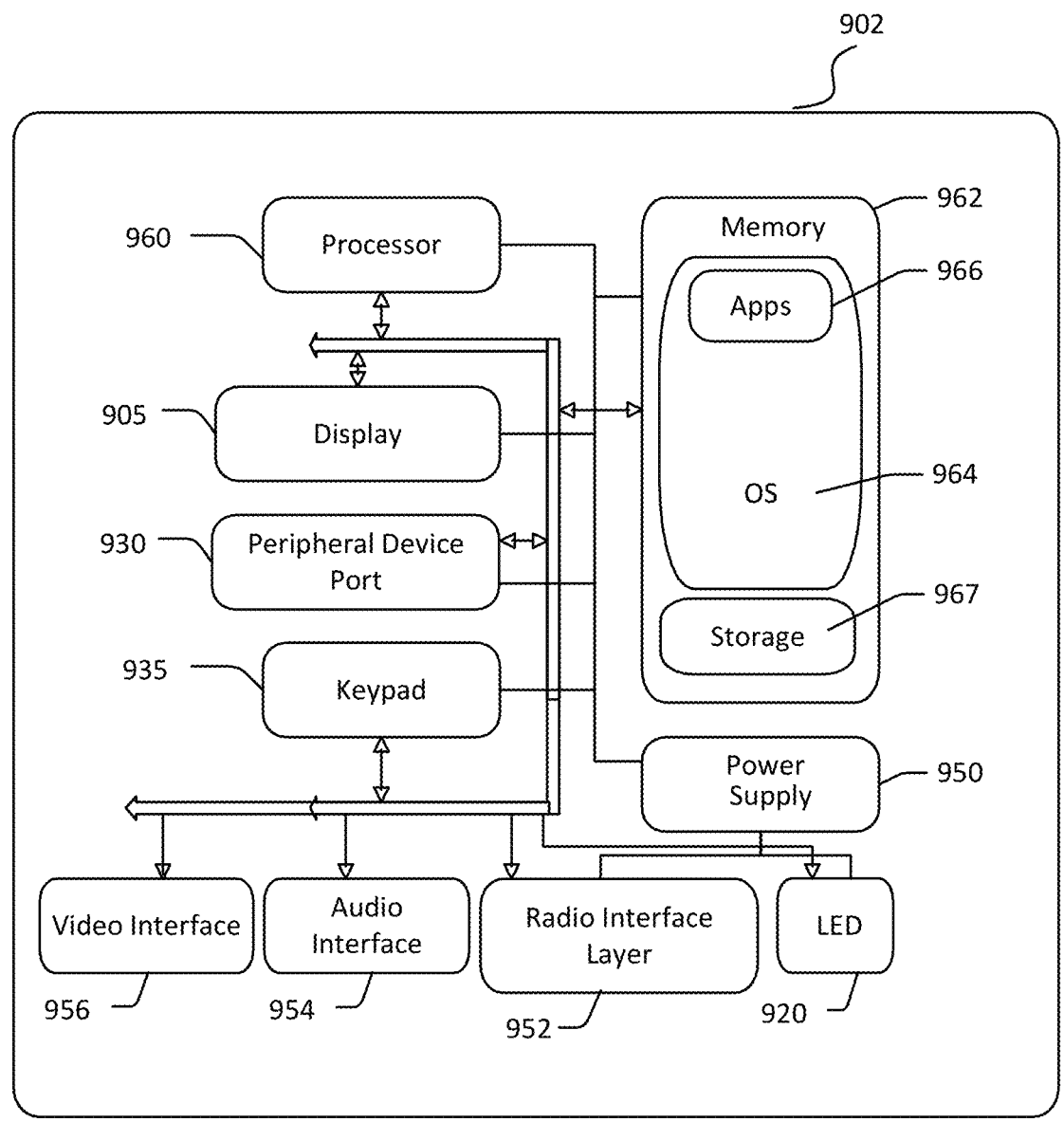

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In at least some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In at least some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In at least some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 952 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 952 or via a distributed computing network. Similarly, such data/information may be readily transferred between computing devices for storage and use according to well-known data/information transfer and storage means, including electronic mail and collaborative data/information sharing systems.

Figure 10:
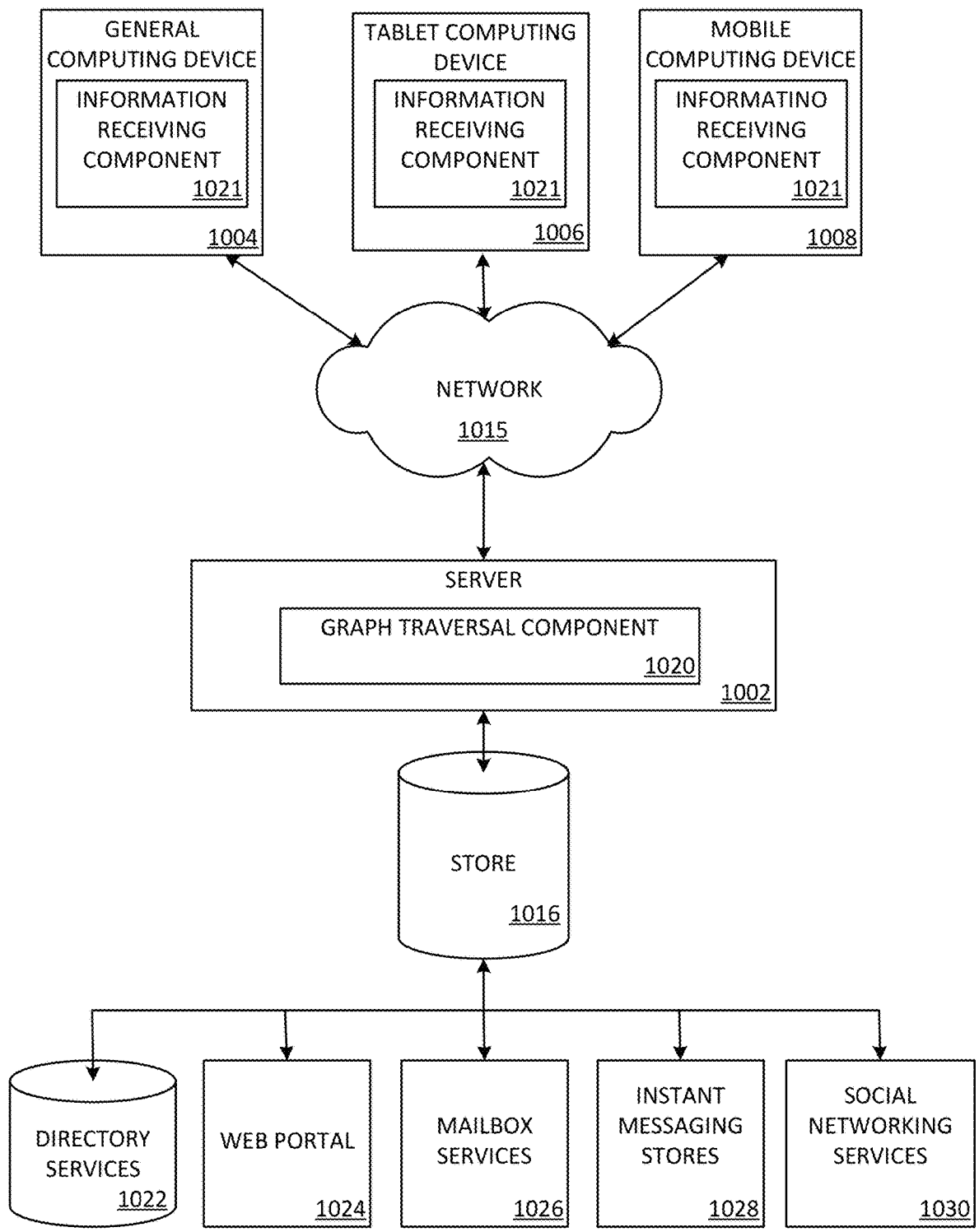
FIG. 10 is a simplified block diagram of a distributed computing system in which aspects of the present disclosure may be practiced in accordance with aspects of the present disclosure.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. A information receiving component 1021 may be employed by a client that communicates with server device 1002, and/or graph traversal component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
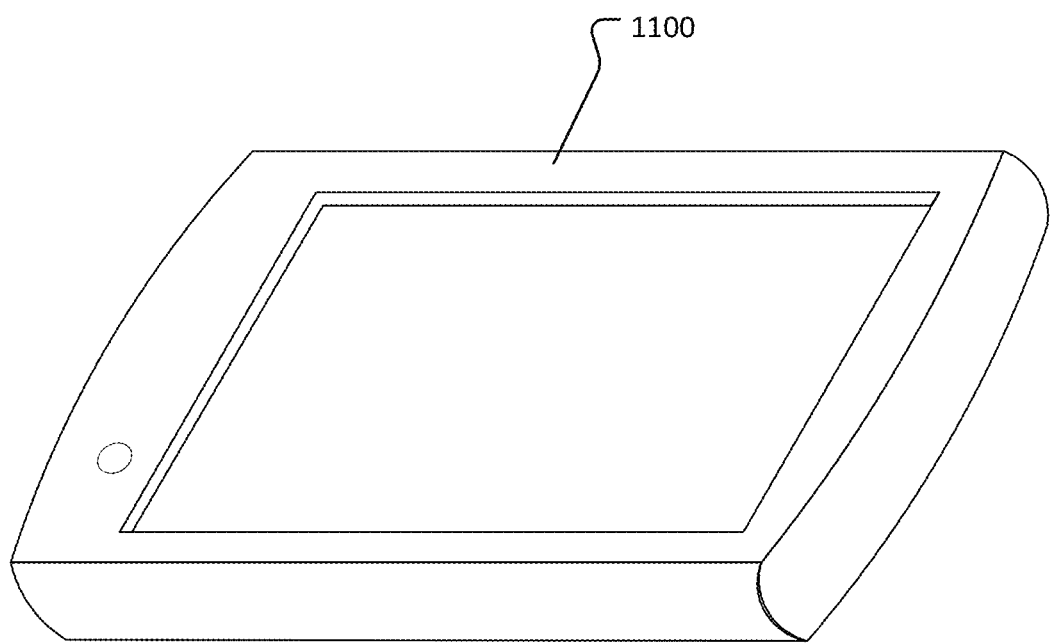
FIG. 11 illustrates a tablet computing device for executing one or more aspects of the present disclosure in accordance with aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

An aspect herein can include a computer-implemented method for traversing a graph database based on a request for an entity, the method comprising: retrieving a subgraph of a graph, wherein the subgraph is associated with a previous traversal of the graph for searching the entity; determining a link to follow in the subgraph for a graph traversal; retrieve the entity from the subgraph; determining a version of data in the entity of the graph based on an availability status of the version of data in the entity of the graph; and updating data in the entity in the subgraph based on corresponding data in the graph when the data in the entity in the subgraph and the data in the entity in the graph based on the version of data are distinct.

One or more of the above aspects comprise determining the version of data in the entity based on the latest available version of the data; and providing data in the entity in the subgraph.

One or more of the above aspects comprise receiving a request for a data in the entity of the graph; and providing the received data according to the determined version of data in the entity of the subgraph.

One or more of the above aspects, wherein the graph traversal is top-down and according to a breadth-first rule.

One or more of the above aspects, wherein the graph includes a subject, a predicate, and an object, and the subgraph being a subset of the graph.

One or more of the above aspects comprise generating a subgraph of a graph based on a traversal on the graph for the entity; storing a first timestamp of generating the subgraph; storing a second timestamp of updating the availability status of the version of data in the entity; receiving the data of the determined version from the entity in the graph when the first timestamp is older than the second timestamp; and updating the subgraph with the received data in the entity.

One or more of the above aspects, wherein the graph traversal includes: determining links to follow based on a structure of the graph; determining the version of the data to retrieve from the entity based on the availability status of the version of the data in the entity of the graph; and converting the entity into at least a part of a fact.

One or more of the above aspects comprise deleting the version of data in the entity of the graph; updating the availability status of the version of data in the entity of the graph; and receiving data according to the determined version from the entity of the graph when a version of data in the entity of the subgraph fails to match the determined version of data.

One or more of the above aspects, wherein the availability status of the version of data in the entity is in a freshness table and the freshness table including one or more of: an entity identifier; a source identifier, wherein the source identifier is an identifier of a source that provides the data in the entity; an availability status of a version of the data in the entity of the graph; and a deletion flag of the version of the data in the graph.

One or more of the above aspects comprise determining traversal path information based on a query configuration, wherein the query configuration includes types of entities, a limitation of levels of the graph for traversal, and structural information about the graph; receiving version information of the version of data in the entity of the graph from a source configuration, wherein the source configuration includes source identifiers and versions of data to access for respective sources; and determining a version of data in the entity of the graph based on the source configuration and the freshness table.

Another aspect herein can include a computing device comprising: at least one processing unit; and at least one memory storing computer executable instructions for storing data to a graph database, the instructions when executed by the at least one processing unit causing the computing device to perform steps of: retrieving a subgraph of a graph, wherein the subgraph is associated with a previous traversal of the graph for an entity; determine a link to follow in the subgraph for a graph traversal associated with the entity of the graph; determine a version of data in the entity based on availability status of a version of data in the entity of the graph; receiving data according to the determined version of data in the entity when the determined version of data in the entity of the graph is newer than the data in a second entity of the subgraph, the second entity corresponding to the entity; and updating the data in the second entity of the subgraph based on the received data.

One or more of the above aspects comprise receiving a request for the entity; generating a subgraph of a graph based on a traversal on the graph for at least one entity; storing a first timestamp of generating the subgraph; storing a second timestamp of updating the availability of the version of data in the entity; receiving the data according to the determined version of the data in the entity in the graph when the first timestamp is before the second timestamp; and updating the subgraph with the received data in the entity.

One or more of the above aspects, the steps further comprising: deleting the version of data in the entity of the graph; updating the availability status of the version of data in the entity of the graph; and receiving data according to the determined version from the entity of the graph when a version of data in the entity of the subgraph fails to match the deleted version of data.

One or more of the above aspects, wherein the availability of the version of data in the entity is in a freshness table and the freshness table including: an entity identifier; a source identifier, wherein the source identifier is an identifier of a source that provides the data in the entity; the availability status of the version of the data in the entity of the graph; and a deletion flag of the version of the data in the graph.

One or more of the above aspects comprise determining traversal path information based on a query configuration, wherein the query configuration includes types of entities, a limitation of levels of the graph for traversal, and structural information about the graph; receiving version information of the version of data in the entity of the graph from a source configuration, wherein the source configuration includes source identifiers and versions of data to access for respective sources; and determining a version of data in the entity of the graph based on the source configuration and the freshness table.

Another aspect herein can include a computer storage medium storing computer executable instructions for traversing data in a graph database, the instructions when executed by at least one processing unit, cause the at least one processing unit to perform steps of: retrieving a subgraph of a graph, wherein the subgraph is associated with a previous traversal of the graph for an entity of the graph; determining a link to follow in the subgraph for a graph traversal associated with the entity of the graph; determining a version of data in the entity of the graph based on an availability status of a version of data in the entity of the graph; receiving data according to the determined version of data in the entity of the graph when the determined version of data in the entity of the graph is newer than the data in a second entity of the subgraph, the second entity corresponding to the entity of the graph; and updating the data in the second entity of the subgraph based on the received data.

One or more of the above aspects, the steps further comprising: receiving a request for a data in the entity of the graph; generating a subgraph of a graph based on a traversal on the graph for at least one entity; updating a first timestamp when generating the subgraph; updating a second timestamp when updating the availability status of the version of data in the entity; receiving the data according to the determined version of the data in the entity in the graph when the first timestamp is before the second timestamp; updating the subgraph with the received data in the entity; and providing the received data according to the determined version of data in the entity of the graph.

One or more of the above aspects, the steps further comprising: deleting the version of data in the entity of the graph; updating the availability status of the version of data in the entity of the graph; and receiving data according to the determined version from the entity of the graph when a version of data in the entity of the subgraph fails to match the determined version of the data in the entity in the graph.

One or more of the above aspects, wherein the availability status of the version of data in the entity is in a freshness table and the freshness table including one or more of: an entity identifier; a source identifier, wherein the source identifier is an identifier of a source that provides the data in the entity; the availability status of the version of the data in the entity of the graph; and a deletion flag of the version of the data in the graph.

One or more of the above aspects, the steps further comprising: determining traversal path information based on a query configuration, wherein the query configuration includes types of entities, a limitation of levels of the graph for traversal, and structural information about the graph; receiving version information of the version of data in the entity of the graph from a source configuration, wherein the source configuration includes source identifiers and versions of data to access for respective sources; and determining a version of data in the entity of the graph based on the source configuration and the freshness table.

Any of the one or more above aspects in combination with any other of the one or more above aspect.

Any of the one or more aspects as described herein.

What is claimed is:

1. A computer-implemented method for traversing a graph in a graph database, the method comprising:
    generating a subgraph based on a first graph traversal of the graph in response to a search for an entity from the graph;
    receiving a request for the entity;
    retrieving the subgraph of the graph;
    determining a link to follow in the subgraph for a second graph traversal to the entity;
    retrieving the entity from the subgraph;
    determining a version of data to select for the entity, from a plurality of versions of data for the entity that are each accessible, by:
        selecting a graph version of the data corresponding to the entity from the graph when the graph version of the data is newer than a subgraph version of the data for the entity in the subgraph; and
        selecting the subgraph version of the data when the subgraph version of the data matches the graph version of the data;
    fetching the selected version of the data when it is useable; and
    fetching a previous version of the data when the selected version of the data is unusable.

2. The computer-implemented method of claim 1, the method further comprising:
    receiving a request for data for the entity; and
    providing data according to the determined version of data for the entity.

3. The computer-implemented method of claim 1, wherein the second graph traversal is top-down and according to a breadth-first rule.

4. The computer-implemented method of claim 1, wherein the graph includes a subject, a predicate, and an object, and the subgraph is a subset of the graph.

5. The computer-implemented method of claim 1, the method further comprising:
    storing a first timestamp of generating the subgraph;
    storing a second timestamp of updating an availability status of the determined version of data for the entity;
    receiving the data of the determined version from the entity in the graph when the first timestamp is older than the second timestamp; and
    updating the subgraph with the received data for the entity.

6. The computer-implemented method of claim 5, wherein the graph traversal includes:
    determining links to follow based on a structure of the graph;
    determining the version of the data to retrieve for the entity based on the availability status of the version of the data for the entity of the graph; and
    converting the entity into at least a part of a fact.

7. The computer-implemented method of claim 5, further comprising:
    deleting the determined version of data for the entity;
    updating the availability status of the determined version of data for the entity; and
    receiving data for the entity from the graph when a version of data for the entity of the subgraph fails to match the determined version of data.

8. The computer-implemented method of claim 5, wherein the availability status of the plurality of versions of data for the entity is in a freshness table and the freshness table includes one or more of:
    an entity identifier;
    a source identifier, wherein the source identifier is an identifier of a source that provides the data for the entity;
    an availability status of a version of the data for the entity; and
    a deletion flag of the version of the data in the graph.

9. The computer-implemented method of claim 8, further comprising:
    determining traversal path information based on a query configuration, wherein the query configuration includes types of entities, a limitation of levels of the graph for traversal, and structural information about the graph;
    receiving version information of the version of data for the entity of the graph from a source configuration, wherein the source configuration includes source identifiers and versions of data to access for the source identifiers; and
    determining a version of data for the entity of the graph based on the source configuration and the freshness table.

10. A computing device for traversing a graph in a graph database, comprising:
    at least one processing unit; and
    at least one memory storing computer executable instructions for storing data to a graph database, the instructions when executed by the at least one processing unit causing the computing device to perform steps of:
        generating a subgraph based on a first graph traversal of the graph in response to a search for an entity;
        receiving a request for the entity;
        retrieving the subgraph of the graph;
        determining a link to follow in the subgraph for a second graph traversal to the entity;
        retrieving the entity from the subgraph;
        determining a version of data to select for the entity based on an availability status of each of from a plurality of versions of data for the entity that are each accessible, by:
            selecting a graph version of the data corresponding to the entity from the graph when the graph version of the data is newer than a subgraph version of the data for the entity in the subgraph; and selecting the subgraph version of the data when the subgraph version of the data matches the graph version of the data;

fetching the selected version of the data when it is usable; and fetching a previous version of the data when the selected version of the data is unusable.

11. The computing device of claim 10, the steps further comprising:

storing a first timestamp of generating the subgraph;

storing a second timestamp of updating an availability status of a version of data for the entity;

receiving data for the entity from the graph when the first timestamp is after the second timestamp; and updating the subgraph with the received data for the entity.

12. The computing device of claim 10, the steps further comprising:

deleting a version of data for the entity;

updating an availability status of the deleted version of data for the entity; and receiving data for the entity from the graph when a version of data for the entity of the subgraph matches the deleted version of data.

13. The computing device of claim 12, wherein the availability status of each of the plurality of versions of data for the entity is in a freshness table and the freshness table includes:

an entity identifier;

a source identifier, wherein the source identifier is an identifier of a source that provides the data for the entity;

the availability status of each of the plurality of versions of the data for the entity of the graph; and a deletion flag for each of the plurality of versions of the data in the graph.

14. The computing device of claim 13, the steps further comprising:

determining traversal path information based on a query configuration, wherein the query configuration includes types of entities, a limitation of levels of the graph for traversal, and structural information about the graph;

receiving version information of the version of data for the entity of the graph from a source configuration, wherein the source configuration includes source identifiers and versions of data to access for the respective source identifiers; and determining a version of data for the entity based on the source configuration and the freshness table.

15. A computer storage medium storing computer executable instructions for traversing a graph in a graph database, the instructions when executed by at least one processing unit, cause the at least one processing unit to perform steps of:

generating a subgraph based on a first graph traversal of the graph in response to a search for an entity;

receiving a request for the entity;

retrieving the subgraph of the graph;

determining a link to follow in the subgraph for a second graph traversal to the entity;

determining a version of data to select for the entity, from a plurality of versions of data for the entity that are each accessible, by:

selecting a graph version of the data corresponding to the entity from the graph when the graph version of the data is newer than a subgraph version of the data for the entity in the subgraph; and selecting the subgraph version of the data when the subgraph version of the data matches the graph version of the data;

fetching the selected version of data when it is usable; and fetching a previous version of the data when the selected version of the data is unusable.

16. The computer storage medium of claim 15, the steps further comprising:

updating a first timestamp when generating the subgraph;

updating a second timestamp when updating an availability status of a version of data for the entity;

receiving the data according to the determined version of the data for the entity from the graph when the first timestamp is after the second timestamp;

updating the subgraph with the received data for the entity; and providing the received data for the entity from the subgraph.

17. The computer storage medium of claim 15, the steps further comprising:

deleting the determined version of data for the entity;

updating an availability status of the determined version of data for the entity; and receiving data for the entity from the graph when a version of data for the entity in the subgraph matches the deleted version of data.

18. The computer storage medium of claim 15, wherein the availability status of the version of data for the entity is in a freshness table and the freshness table including one or more of:

an entity identifier;

a source identifier, wherein the source identifier is an identifier of a source that provides the data for the entity;

an availability status of a version of the data for the entity; and a deletion flag for the version of the data.

19. The computer storage medium of claim 18, the steps further comprising:

determining traversal path information based on a query configuration, wherein the query configuration includes types of entities, a limitation of levels of the graph for traversal, and structural information about the graph;

receiving version information of the version of data for the entity from a source configuration, wherein the source configuration includes source identifiers and versions of data to access for the source identifiers; and determining a version of data for the entity based on the source configuration and the freshness table.

* * * * *